(12) United States Patent
Papasakellariou

(10) Patent No.: US 11,784,777 B2
(45) Date of Patent: Oct. 10, 2023

(54) LINK ADAPTATION FOR COVERAGE ENHANCEMENTS AND SUPPORT OF DIFFERENT SERVICE TYPES

(71) Applicant: Samsung Electronics Co., Ltd., Suwon-si (KR)

(72) Inventor: Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/659,648

(22) Filed: Apr. 18, 2022

(65) Prior Publication Data

US 2022/0255707 A1   Aug. 11, 2022

Related U.S. Application Data

(63) Continuation of application No. 16/780,694, filed on Feb. 3, 2020, now Pat. No. 11,323,231.

(60) Provisional application No. 62/818,160, filed on Mar. 14, 2019, provisional application No. 62/804,475, filed on Feb. 12, 2019.

(51) Int. Cl.
| | |
|---|---|
| *H04L 27/22* | (2006.01) |
| *H04L 5/00* | (2006.01) |
| *H04B 7/06* | (2006.01) |
| *H04B 7/0456* | (2017.01) |
| *H04W 72/21* | (2023.01) |

(52) U.S. Cl.
CPC ......... *H04L 5/0057* (2013.01); *H04B 7/0456* (2013.01); *H04B 7/063* (2013.01); *H04B 7/0626* (2013.01); *H04W 72/21* (2023.01)

(58) Field of Classification Search
CPC ... H04L 5/0004; H04L 5/0053; H04L 5/0082; H04L 27/22; H04L 7/0334; H04W 2/0446; H04W 48/16; H04W 74/0808; H04B 17/309; H04B 7/0626
USPC ........................................................ 375/329
See application file for complete search history.

(56) References Cited

U.S. PATENT DOCUMENTS

| | | | |
|---|---|---|---|
| 11,381,944 B2 * | 7/2022 | Kim | ........................ H04W 4/44 |
| 2017/0156152 A1 | 6/2017 | Nazar et al. | |
| 2017/0180099 A1 | 6/2017 | Kim et al. | |

(Continued)

FOREIGN PATENT DOCUMENTS

| | | |
|---|---|---|
| WO | 2017162050 A1 | 9/2017 |
| WO | 2020009383 A1 | 1/2020 |

OTHER PUBLICATIONS

Extended European Search Report dated Feb. 8, 2022 regarding Application No. 20756091.3, 8 pages.

(Continued)

*Primary Examiner* — Khai Tran

(57) ABSTRACT

A methods and apparatuses for providing and configuring channel state information (CSI) reports. A method of operating a user equipment includes receiving a channel state information reference signal (CSI-RS) and generating, based on the CSI-RS reception, a first CSI report and a second CSI report. The first CSI report includes a first channel quality indicator (CQI) index from a first set of CQI indexes and the second CSI report includes a second CQI index from a second set of CQI indexes. The method further includes transmitting the first CSI report in a first channel and the second CSI report in a second channel.

20 Claims, 13 Drawing Sheets

(56) References Cited

U.S. PATENT DOCUMENTS

| | | | |
|---|---|---|---|
| 2018/0124824 A1* | 5/2018 | Lee | H04W 48/16 |
| 2018/0213430 A1 | 7/2018 | Yokomakura et al. | |
| 2018/0317220 A1 | 11/2018 | Takahashi et al. | |
| 2019/0173651 A1* | 6/2019 | Zhang | H04L 1/1861 |
| 2019/0268903 A1* | 8/2019 | Lee | H04L 1/1854 |
| 2021/0321394 A1* | 10/2021 | Li | H04W 72/0446 |

OTHER PUBLICATIONS

CATT, "UL control enhancements for URLLC", 3GPP TSG RAN WG1 Ad-Hoc Meeting 1901, R1-1900332, Jan. 2019, 8 pages.

"3rd Generation Partnership Project; Technical Specification Group Radio Access Network; NR; Physical layer procedures for control (Release 15)", 3GPP TS 38.213 V15.3.0, Sep. 2018, 101 pages.

"3rd Generation Partnership Project; Technical Specification Group Radio Access Network; NR; Physical channels and modulation (Release 15)", 3GPP TS 38.211 V15.4.0, Dec. 2018, 96 pages.

"3rd Generation Partnership Project; Technical Specification Group Radio Access Network: NR; Multiplexing and channel coding (Release 15)", 3GPP TS 38.212 V15.4.0, Dec. 2018, 100 pages.

"3rd Generation Partnership Project; Technical Specification Group Radio Access Network: NR; Physical layer procedures for control (Release 15)" 3GPP TS 38.213 V15.4.0, Dec. 2018, 104 pages.

"3rd Generation Partnership Project; Technical Specification Group Radio Access Network: NR; Physical layer procedures for data (Release 15)", 3GPP TS 38.214 V15.4.0, Dec. 2018, 102 pages.

"3rd Generation Partnership Project; Technical Specification Group Radio Access Network; NR; Medium Access Control (MAC) protocol specification (Release 15)", 3GPP TS 38.321 V15.4.0, Dec. 2018, 77 pages.

"3rd Generation Partnership Project; Technical Specification Group Radio Access Network; NR; Radio Resource Control (RRC) protocol specification (Release 15)", 3GPP TS 38.331 V15.4.0, Dec. 2018, 474 pages.

International Search Report and Written Opinion of the International Searching Authority in connection with International Application No. PCT/KR2020/001849 dated May 27, 2020, 11 pages.

Vivo, "Discussion on handling UL multiplexing of transmissions with different reliability requirements," R1-1803848, 3GPP TSG RAN WG1 Meeting #92bis, Sanya, China, Apr. 16-20, 2018, 10 pages.

* cited by examiner

LINK ADAPTATION FOR COVERAGE ENHANCEMENTS AND SUPPORT OF DIFFERENT SERVICE TYPES

CROSS-REFERENCE TO RELATED APPLICATIONS AND CLAIM OF PRIORITY

This application is a continuation of U.S. patent application Ser. No. 16/780,694, filed on Feb. 3, 2020, which claims priority to U.S. Provisional Patent Application No. 62/804,475, filed on Feb. 12, 2019, and U.S. Provisional Patent Application No. 62/818,160 filed on Mar. 14, 2019, the disclosures of which are incorporated herein by reference in their entireties.

TECHNICAL FIELD

The present disclosure relates generally to wireless communication systems. More particularly, the present disclosure relates to adjusting a number of repetitions of a physical uplink control channel (PUCCH) transmission from a user equipment (UE) communicating with a base station. The present disclosure additionally relates to enabling link adaptation for communication support of different service types for the UE. The present disclosure further relates to multiplexing control information for services with different priorities in a PUCCH or in a physical uplink shared channel (PUSCH).

BACKGROUND

There is a demand for an improved 5G communication system. The 5G communication system is implemented in higher frequency (mmWave) bands, for example 28 GHz bands or 60 GHz bands, to enable higher data rates. A UE and a base station (BS or gNB) can support simultaneous transmissions and receptions for different service/priority types associated with different reliability or latency requirements by utilizing PUCCHs, physical downlink control channels (PDCCHs), physical uplink shared channels (PUSCHs), and physical downlink shared channels (PDSCHs). However, a transmission from the UE to the gNB can sometimes be suspended by the UE or not be received correctly by the gNB. Accordingly, a retransmission can be triggered. Also, different service/priority types can have different latency or reliability requirements that necessitate different link adaptation mechanisms and prioritization mechanisms in case of an inability by the UE to support simultaneous transmission of information for different service/priority types.

SUMMARY

The present disclosure relates to adjusting a number of repetitions for a PUCCH transmission.

In one embodiment, a method for a UE to provide channel state information (CSI) reports is provided. The method includes receiving a channel state information reference signal (CSI-RS) and generating, based on the CSI-RS reception, a first CSI report and a second CSI report. The first CSI report includes a first channel quality indicator (CQI) index from a first set of CQI indexes and the second CSI report includes a second CQI index from a second set of CQI indexes. The method further includes transmitting the first CSI report in a first channel and the second CSI report in a second channel.

In another embodiment, a UE is provided. The UE includes a receiver configured to receive a CSI-RS and a processor configured to generate, based on the CSI-RS reception, a first CSI report and a second CSI report. The first CSI report includes a first channel quality indicator (CQI) index from a first set of CQI indexes and the second CSI report includes a second CQI index from a second set of CQI indexes. The UE includes a transmitter configured to transmit the first CSI report in a first channel and the second CSI report in a second channel.

In yet another embodiment, a BS is provided. The BS includes a transmitter configured to transmit, to a UE, a CSI-RS and a receiver configured to receive, from the UE, a channel with a first CSI report and a second CSI report generated based on the CSI-RS. The first CSI report includes a first CQI index from a first set of CQI indexes and the second CSI report includes a second CQI index from a second set of CQI indexes.

Other technical features may be readily apparent to one skilled in the art from the following figures, descriptions, and claims.

Before undertaking the DETAILED DESCRIPTION below, it can be advantageous to set forth definitions of certain words and phrases used throughout this disclosure. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many, if not most, instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 18, discussed below, and the various embodiments used to describe the principles of the present disclosure in this disclosure are by way of illustration only and should not be construed in any way to limit the scope of the disclosure. Those skilled in the art will understand that the principles of the present disclosure can be implemented in any suitably arranged wireless communication system.

Depending on the network type, the term 'base station' can refer to any component (or collection of components) configured to provide wireless access to a network, such as transmit point (TP), transmit-receive point (TRP), a gNB, a macrocell, a femtocell, a WiFi access point (AP), or other wirelessly enabled devices. Base stations can provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. The terms 'gNB' and 'TRP' can be used interchangeably in this disclosure to refer to network infrastructure components that provide wireless access to remote terminals. Also, depending on the network type, the term UE can refer to any component such as mobile station, subscriber station, remote terminal, wireless terminal, receive point, or user device. A UE can be a mobile device or a stationary device.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented to include higher frequency (mmWave) bands, such as 28 GHz or 60 GHz bands or, in general, above 6 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are considered in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

The discussion of 5G systems and frequency bands associated therewith is for reference as certain embodiments of the present disclosure can be implemented in 5G systems. However, the present disclosure is not limited to 5G systems or the frequency bands associated therewith, and embodiments of the present disclosure can be utilized in connection with any frequency band.

Figure 1:
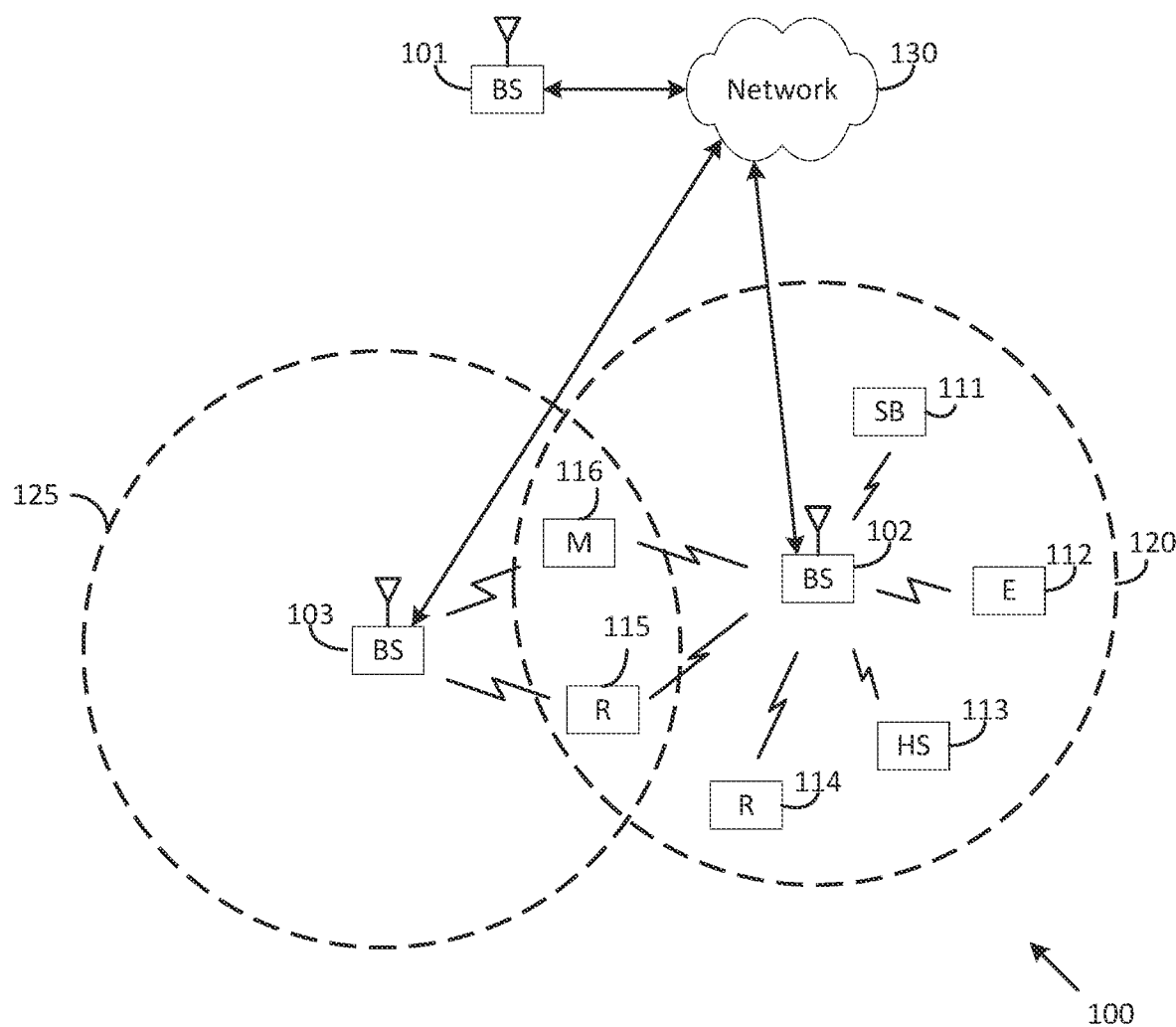
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a BS 101, a BS 102, and a BS 103. The BS 101 communicates with the BS 102 and the BS 103. The BS 101 also communicates with at least one Internet Protocol (IP) network 130, such as the Internet, a proprietary IP network, or other data network. Instead of "BS", an option term such as "eNB" (enhanced Node B) or "gNB" (general Node B) can also be used. Depending on the network type, other well-known terms can be used instead of "gNB" or "BS," such as "base station" or "access point." For the sake of convenience, the terms "gNB" and "BS" are used in the present disclosure to refer to network infrastructure components that provide wireless access to remote terminals. Depending on the network type, other well-known terms can be used instead of "user equipment" or "UE," such as "mobile station," "subscriber station," "remote terminal," "wireless terminal," or "user device." For the sake of convenience, the terms "user equipment" and "UE" are used in the present disclosure to refer to remote wireless equipment that wirelessly accesses an gNB, whether the UE is a mobile device (such as a mobile telephone or smartphone) or is normally considered a stationary device (such as a desktop computer or vending machine).

The gNB 102 provides wireless broadband access to the network 130 for a first plurality of UEs within a coverage area 120 of the gNB 102. The first plurality of UEs includes a UE 111, which can be located in a small business (SB); a UE 112, which can be located in an enterprise (E); a UE 113, which can be located in a WiFi hotspot (HS); a UE 114, which can be located in a first residence (R); a UE 115, which can be located in a second residence (R); and a UE 116, which can be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 can communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. For example, the coverage areas associated with gNBs, such as the coverage areas 120 and 125, can have other shapes, including irregular shapes, depending upon the configuration of the gNBs and variations in the radio environment associated with natural and man-made obstructions.

As described in more detail below, one or more of gNB 101, gNB 102, and gNB 103 can configure UEs 111-116 for channel state information reporting as described in embodiments of the present disclosure. In various embodiments, one or more of UEs 111-116 transmit channel state information reports as described in embodiments of the present disclosure.

Although FIG. 1 illustrates one example of a wireless network 100, various changes can be made to FIG. 1. For example, the wireless network 100 can include any number of gNBs and any number of UEs in any suitable arrangement. The gNB 101 can communicate directly with any number of UEs and provide those UEs with wireless broadband access to the network 130. Similarly, each gNB 102-103 can communicate directly with the network 130 and provide UEs with direct wireless broadband access to the network 130. Further, the gNB 101, 102, and/or 103 can provide access to other or additional external networks, such as other types of data networks.

Figure 2A:
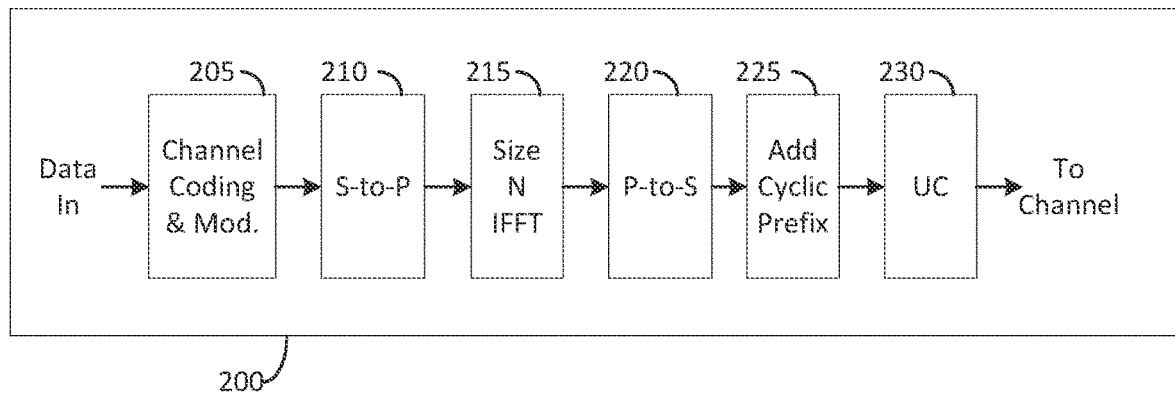
FIGS. 2A and 2B illustrate example wireless transmit and receive paths according to various embodiments of the present disclosure.
Figure 2B:
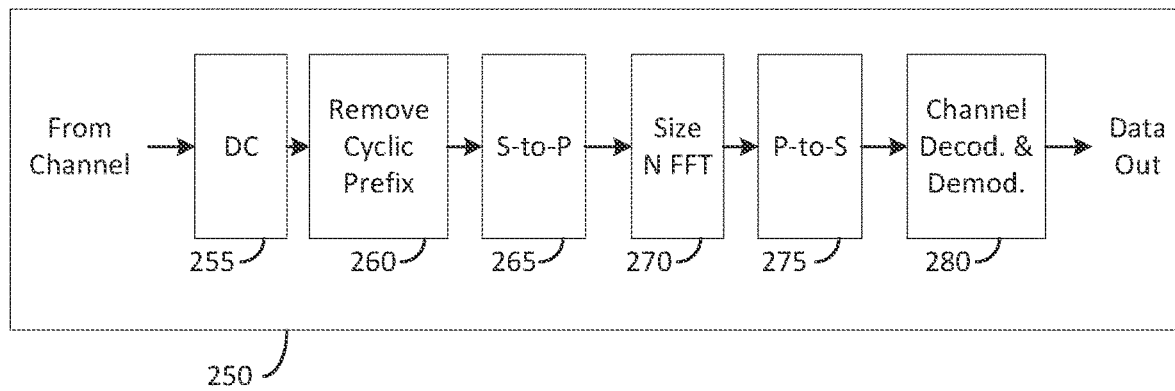

FIGS. 2A and 2B illustrate example wireless transmit and receive paths according to the present disclosure. In the following description, a transmit path 200 can be described as being implemented in a gNB (such as gNB 102), while a receive path 250 can be described as being implemented in a UE (such as UE 116). However, it will be understood that the receive path 250 can be implemented in a gNB (such as gNB 102) and that the transmit path 200 can be implemented in a UE (such as UE 116). In some embodiments, the receive path 250 is configured to receive channel and interference measurement information as described in various embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an 'add cyclic prefix' block 225, and an up-converter (UC) 230. The receive path 250 includes a down-converter (DC) 255, a 'remove cyclic prefix' block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as convolutional, Turbo, polar, or low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The S-to-P block 210 converts (such as de-multiplexes) the serial modulated symbols to parallel data in order to generate N parallel symbol streams, where N is the IFFT/FFT size used in the gNB 102 and the UE 116. The size N IFFT block 215 performs an IFFT operation on the N parallel symbol streams to generate time-domain output signals. The P-to-S block 220 converts (such as multiplexes) the parallel time-domain output symbols from the size N IFFT block 215 in order to generate a serial time-domain signal. The 'add cyclic prefix' block 225 inserts a cyclic prefix to the time-domain signal. The UC 230 modulates (such as up-converts) the output of the 'add cyclic prefix' block 225 to an RF frequency for transmission via a wireless channel. The signal can also be filtered at baseband before conversion to the RF frequency.

A transmitted RF signal from the gNB 102 arrives at the UE 116 after passing through the wireless channel, and reverse operations to those at the gNB 102 are performed at the UE 116. The DC 255 down-converts the received signal to a baseband frequency, and the 'remove cyclic prefix' block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

As described in more detail below, the transmit path 200 or the receive path 250 can perform signaling for reporting of uplink control information such as HARQ-ACK information or CSI. Each of the gNBs 101-103 can implement a transmit path 200 that is analogous to transmitting in the downlink to UEs 111-116 and can implement a receive path 250 that is analogous to receiving in the uplink from UEs 111-116. Similarly, each of UEs 111-116 can implement a transmit path 200 for transmitting in the uplink to gNBs 101-103 and can implement a receive path 250 for receiving in the downlink from gNBs 101-103.

Each of the components in FIGS. 2A and 2B can be implemented using only hardware or using a combination of hardware and software/firmware. As a particular example, at least some of the components in FIGS. 2A and 2B can be implemented in software, while other components can be implemented by configurable hardware or a mixture of software and configurable hardware. For instance, the size N FFT block 270 and the size N IFFT block 215 can be implemented as configurable software algorithms, where the value of size N can be modified according to the implementation.

Furthermore, although described as using FFT and IFFT, this is by way of illustration only and should not be construed to limit the scope of the present disclosure. Other types of transforms, such as Discrete Fourier Transform (DFT) and Inverse Discrete Fourier Transform (IDFT) functions, can be used. It will be appreciated that the value of the variable N can be any integer number (such as 1, 2, 3, 4, or the like) for DFT and IDFT functions, while the value of the variable N can be any integer number that is a power of two (such as 1, 2, 4, 8, 16, or the like) for FFT and IFFT functions.

Although FIGS. 2A and 2B illustrate examples of wireless transmit and receive paths, various changes can be made to FIGS. 2A and 2B. For example, various components in FIGS. 2A and 2B can be combined, further subdivided, or omitted and additional components can be added according to particular needs. FIGS. 2A and 2B are meant to illustrate examples of the types of transmit and receive paths that can be used in a wireless network. Other suitable architectures can be used to support wireless communications in a wireless network.

Figure 3A:
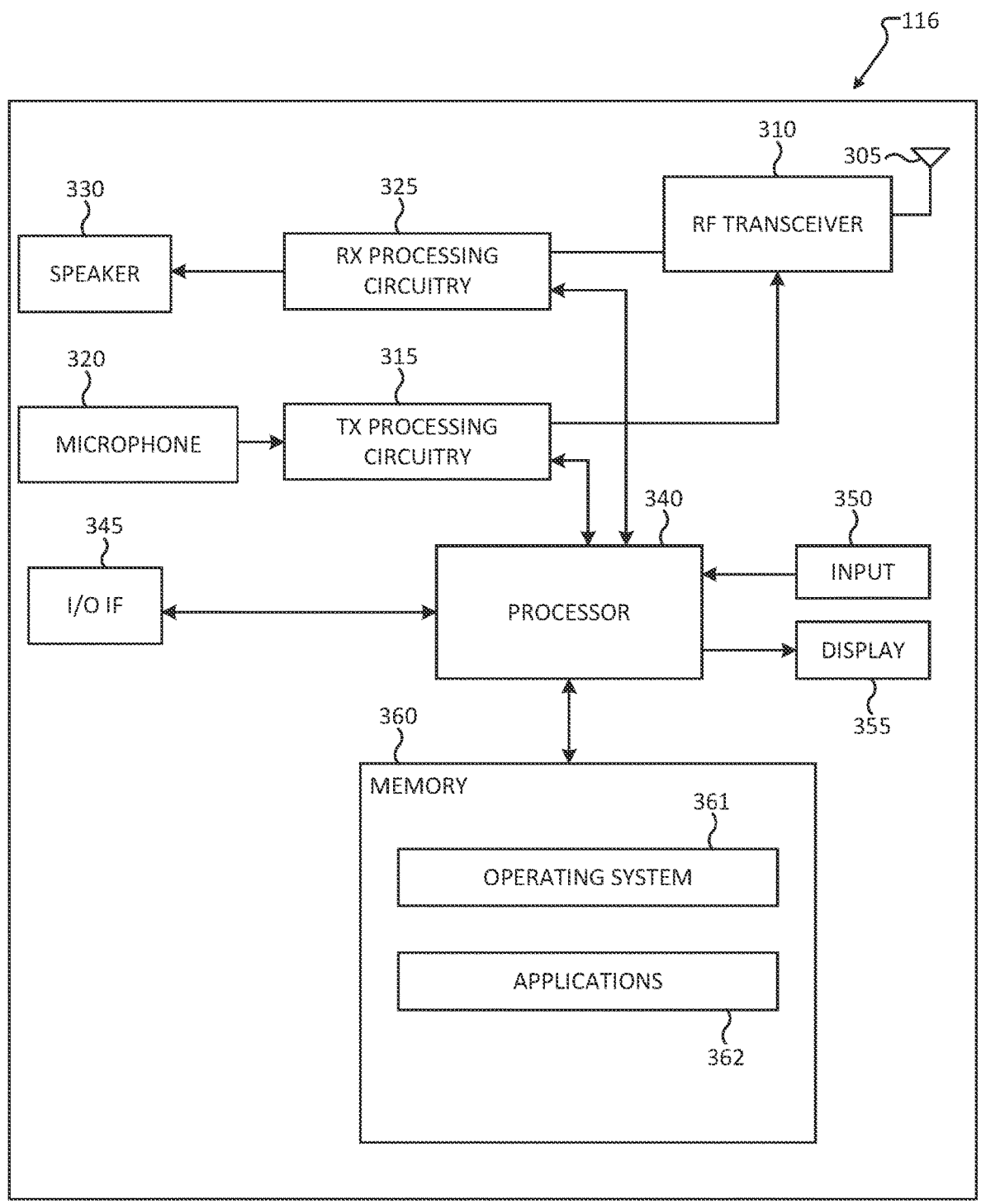
FIG. 3A illustrates an example user equipment according to various embodiments of the present disclosure.

FIG. 3A illustrates an example UE 116 according to the present disclosure. The embodiment of the UE 116 illustrated in FIG. 3A is for illustration only, and the UEs 111-115 of FIG. 1 can have the same or similar configuration. However, UEs come in a wide variety of configurations, and FIG. 3A does not limit the scope of the present disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a processor 340, an input/output (I/O) interface 345, an input 350, a display 355, and a memory 360. The memory 360 includes an operating system (OS) program 361 and one or more applications 362.

The RF transceiver 310 receives, from the antenna 305, an incoming RF signal transmitted by a gNB of the wireless network 100 of FIG. 1. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS program 361 stored in the memory 360 in order to control the overall operation of the UE 116. For example, the processor 340 can control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 can execute other processes and programs resident in the memory 360, such as operations for non-zero power or zero power channel state information reference signal (CSI-RS) reception and measurement for systems described in embodiments of the present disclosure as described in embodiments of the present disclosure. The processor 340 can move data into or out of the memory 360 as part of an executing process. In some embodiments, the processor 340 is configured to execute the applications 362 based on the OS program 361 or in response to signals received from gNBs or an operator. The processor 340 is also coupled to the I/O interface 345, which provides the UE 116 with the ability to connect to other devices such as laptop computers and handheld computers. The I/O interface 345 is the communication path between these accessories and the processor 340.

The processor 340 is also coupled to the input 350 (e.g., keypad, touchscreen, button etc.) and the display 355. The operator of the UE 116 can use the input 350 to enter data into the UE 116. The display 355 can be a liquid crystal display or other display capable of rendering text and/or at least limited graphics, such as from web sites.

The memory 360 is coupled to the processor 340. The memory 360 can include at least one of a random-access memory (RAM), Flash memory, or other read-only memory (ROM).

As described in more detail below, the UE 116 can perform signaling and calculation for channel state information (CSI) reporting or signaling for reporting of hybrid automating repeat request acknowledgement (HARQ-ACK) information in a physical uplink control channel (PUCCH) or a physical uplink shared channel (PUSCH). Although FIG. 3A illustrates one example of UE 116, various changes can be made to FIG. 3A. For example, various components in FIG. 3A can be combined, further subdivided, or omitted and additional components can be added according to particular needs. As a particular example, the processor 340 can be divided into multiple processors, such as one or more central processing units (CPUs) and one or more graphics processing units (GPUs). Although FIG. 3A illustrates the UE 116 as a mobile telephone or smartphone, UEs can be configured to operate as other types of mobile or stationary devices.

Figure 3B:
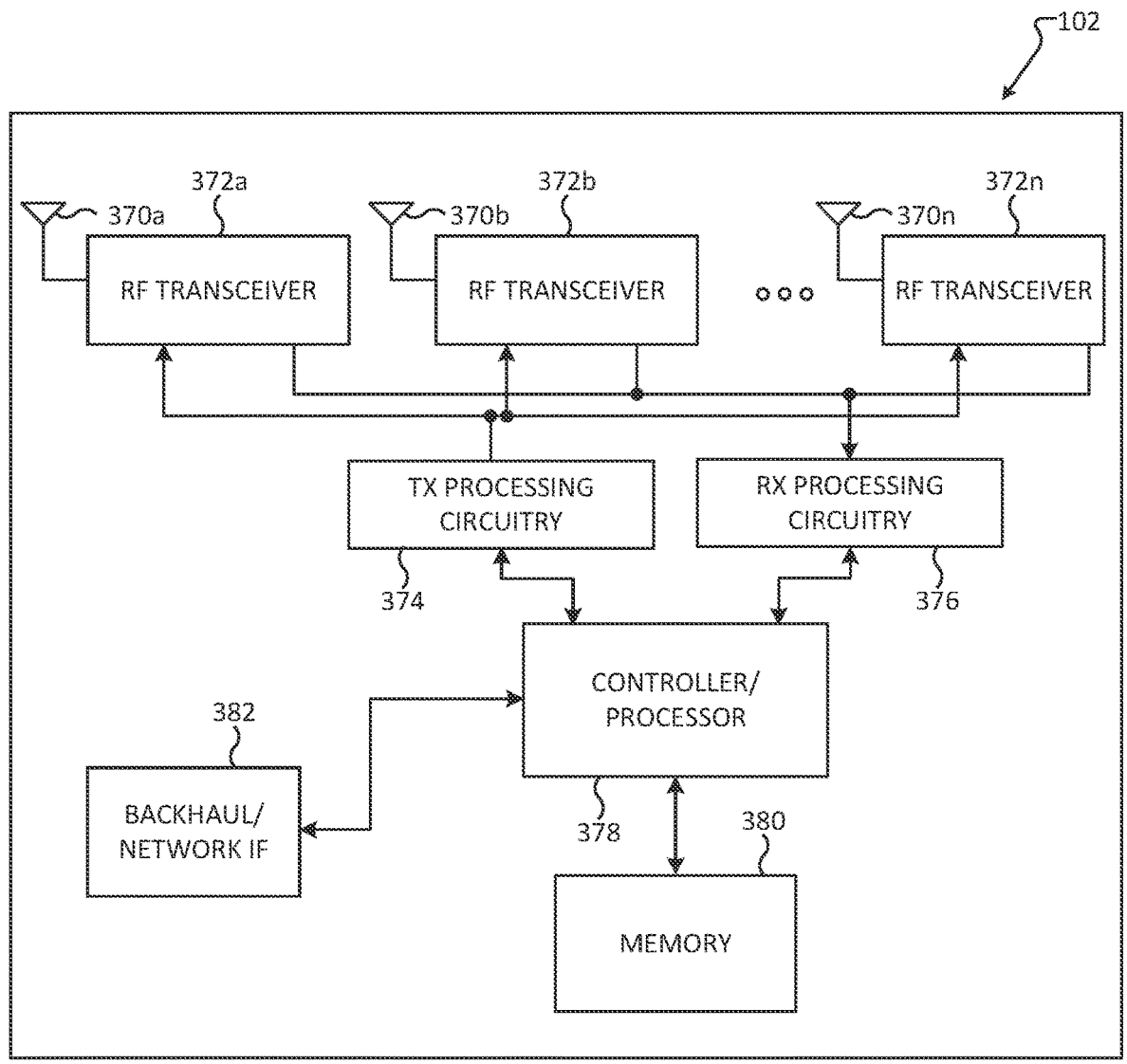
FIG. 3B illustrates an example BS according to various embodiments of the present disclosure.

FIG. 3B illustrates an example gNB 102 according to the present disclosure. The embodiment of the gNB 102 shown in FIG. 3B is for illustration only, and other gNBs of FIG. 1 can have the same or similar configuration. However, gNBs come in a wide variety of configurations, and FIG. 3B does not limit the scope of the present disclosure to any particular implementation of a gNB. The gNB 101 and the gNB 103 can include the same or similar structure as the gNB 102.

As shown in FIG. 3B, the gNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The gNB 102 also includes a controller/processor 378, a memory 380, and a backhaul or network interface 382.

The RF transceivers 372a-372n receive, from the antennas 370a-370n, incoming RF signals, such as signals transmitted by UEs or other gNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the gNB 102. For example, the controller/processor 378 can control the reception of forward channel signals and the transmission of reverse channel signals by the RF transceivers 372a-372n, the RX processing circuitry 376, and the TX processing circuitry 374 in accordance with well-known principles. The controller/processor 378 can support additional functions as well, such as more advanced wireless communication functions. In some embodiments, the controller/processor 378 includes at least one microprocessor or microcontroller.

The controller/processor 378 can execute programs and other processes resident in the memory 380, such as an OS. The controller/processor 378 can support channel quality measurement and reporting for systems having 2D antenna arrays as described in embodiments of the present disclosure. In some embodiments, the controller/processor 378 supports communications between entities, such as web RTC. The controller/processor 378 can move data into or out of the memory 380 as part of an executing process.

The controller/processor 378 is also coupled to the backhaul or network interface 382. The backhaul or network interface 382 allows the gNB 102 to communicate with other devices or systems over a backhaul connection or over a network. The backhaul or network interface 382 can support communications over any suitable wired or wireless connection(s). For example, when the gNB 102 is implemented as part of a cellular communication system (such as one supporting 5G or new radio access technology or NR, LTE, or LTE-A), the backhaul or network interface 382 can allow the gNB 102 to communicate with other gNBs over a wired or wireless backhaul connection. When the gNB 102 is implemented as an access point, the backhaul or network interface 382 can allow the gNB 102 to communicate over a wired or wireless local area network or over a wired or wireless connection to a larger network (such as the Internet). The backhaul or network interface 382 includes any suitable structure supporting communications over a wired or wireless connection, such as an Ethernet or RF transceiver.

The memory 380 is coupled to the controller/processor 378. The memory 380 can include at least one of a RAM, a Flash memory, or other ROM. In certain embodiments, a plurality of instructions, such as a BIS algorithm, is stored in memory. The plurality of instructions, when executed, can cause the controller/processor 378 to perform the BIS process and to decode a received signal after subtracting out at least one interfering signal determined by the BIS algorithm.

As described in more detail below, the transmit and receive paths of the gNB 102 (implemented using the RF transceivers 372a-372n, TX processing circuitry 374, and/or RX processing circuitry 376) transmits UL beam indication information to a UE.

Although FIG. 3B illustrates one example of a gNB 102, various changes can be made to FIG. 3B. For example, the gNB 102 can include any number of each component shown in FIG. 3A. As a particular example, an access point can include a number of backhaul or network interfaces 382, and the controller/processor 378 can support routing functions to route data between different network addresses. As another example, while shown as including a single instance of TX processing circuitry 374 and a single instance of RX processing circuitry 376, the gNB 102 can include multiple instances of each (such as one per RF transceiver).

Rel-13 LTE supports up to 16 CSI-RS antenna ports that can enable a gNB to be equipped with a large number of antenna elements (such as 64 or 128). In this case, a plurality of antenna elements is mapped onto one CSI-RS port. Furthermore, up to 32 CSI-RS ports are supported in Rel-14 LTE. For next generation cellular systems such as 5G, a maximum number of CSI-RS ports can further increase for example to 64.

For mmWave bands, although a number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies).

A time unit for DL signaling or for UL signaling on a cell is one symbol. A symbol belongs to a slot that includes a number of symbols such as 14 symbols and is referred to as DL symbol if used for DL signaling, UL symbol if used for UL signaling, or flexible symbol if it can be used for either DL signaling or UL signaling. The slot can also be a time unit for DL or UL signaling on a cell.

A bandwidth (BW) unit is referred to as a resource block (RB). One RB includes a number of sub-carriers (SCs), such as 12 subcarriers. A RB in one symbol of a slot is referred to as physical RB (PRB) and includes a number of resource elements (REs). For example, a slot can have a duration of 1 millisecond and a RB can have a BW of 180 kHz and include 12 SCs with SC spacing of 15 kHz. As another example, a slot can have a duration of 0.25 milliseconds and a RB can have a BW of 720 kHz and include 12 SCs with SC spacing of 60 kHz.

DL signals include data signals conveying information content, control signals conveying DL control information (DCI), and reference signals (RS) that are also known as pilot signals. A gNB, for example the gNB 102, can transmit data information or DCI through respective physical DL shared channels (PDSCHs) or physical DL control channels (PDCCHs). The gNB can transmit one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources can be used. For interference measurement reports (IMRs), CSI interference measurement (CSI-IM) resources associated with a zero power CSI-RS (ZP CSI-RS) configuration can be used.

A CSI process can include of NZP CSI-RS and CSI-IM resources. A UE, for example the UE 116, can determine CSI-RS transmission parameters through DL control signaling or higher layer signaling, such as radio resource control (RRC) signaling, from a gNB. Transmission instances of a CSI-RS can be indicated by DL control signaling at the physical layer or configured by higher layer signaling. A DMRS is typically received by the UE only in the BW of a respective PDCCH or PDSCH reception and the UE can use the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access. A UE can transmit data information or UCI through a respective physical UL shared channel (PUSCH) or a physical UL control channel (PUCCH). When a UE simultaneously transmits data information and UCI, the UE can multiplex both in a PUSCH or transmit both a PUCCH with UCI and a PUSCH with data information and possibly some UCI. UCI includes hybrid automatic repeat request acknowledgement (HARQ-ACK) information, indicating correct or incorrect decoding of transport blocks (TBs) or code blocks in a PDSCH, scheduling request (SR) indicating whether a UE has data in its buffer, and CSI reports enabling a gNB to select appropriate parameters for PDSCH or PDCCH transmissions to a UE. For systems operating with hybrid beamforming, UCI can also include beam information such as an index for a set of quasi-collocation parameters, from multiple sets of quasi-collocation parameters, for a received signal and a corresponding reference signal received power (RSRP) value.

A CSI report from a UE can include a channel quality indicator (CQI) informing a gNB of a largest modulation and coding scheme (MCS) for the UE to detect a data TB with a predetermined block error rate (BLER), such as a 10% BLER, a precoding matrix indicator (PMI) informing a gNB how to combine signals from multiple transmitter antennas in accordance with a multiple input multiple output (MIMO) transmission principle, and a rank indicator (RI) indicating a transmission rank for a PDSCH.

UL RS includes DMRS and SRS. In some embodiments, DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, a SRS reception by the gNB can also provide a PMI for DL transmissions by the gNB. Additionally, in order to establish synchronization or an initial RRC connection with a gNB, a UE can transmit a physical random-access channel (PRACH).

Figure 4:
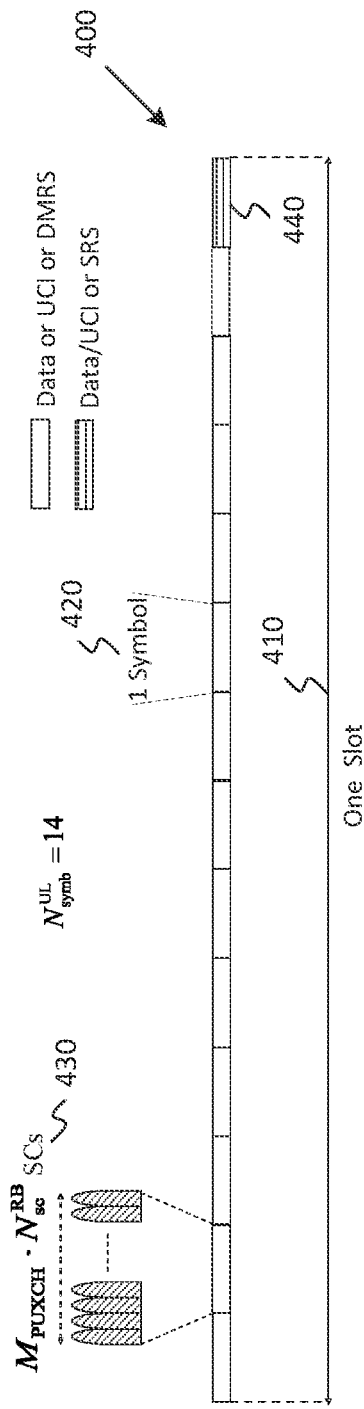
FIG. 4 illustrates an example slot structure for PUSCH transmission or PUCCH transmission according to various embodiments of the present disclosure.

FIG. 4 illustrates an example slot structure for PUSCH transmission or PUCCH transmission according to various embodiments of the present disclosure. The embodiment of the slot structure 400 shown in FIG. 4 is for illustration only and should not be construed as limiting. FIG. 4 does not limit the scope of the present disclosure to any particular slot structure.

A slot 410 can include N b symbols 420 where a UE, such as a UE 111-116, transmits a PUSCH or a PUCCH with data information, UCI, or DMRS. An UL system BW includes $N_{RB}^{UL}$ RBs. Each RB includes $N_{sc}^{RB}$ SCs. The UE 111-116 is assigned $M_{PUXCH}$ RBs for a total of $M_{sc}^{PUXCH}=M_{PUXCH} \cdot N_{sc}^{RB}$ SCs 430 for a PUSCH transmission BW ('X'='S') or for a PUCCH transmission BW ('X'='C'). One or more of last slot symbols can be used to multiplex SRS transmissions 440 from one or more UEs 111-116.

In general, a slot 410 can include a hybrid structure that includes one or more groups of DL symbols, flexible symbols, and UL symbols. For example, a DL transmission region can contain CSI-RS, PDCCH or PDSCH transmissions and an UL transmission region can contain SRS, PUCCH or PUSCH transmissions. In various embodiments, DL transmissions and UL transmissions can be based on an orthogonal frequency division multiplexing (OFDM) waveform including a variant using DFT precoding that is known as DFT-spread-OFDM (DFT-S-OFDM).

Figure 5A:
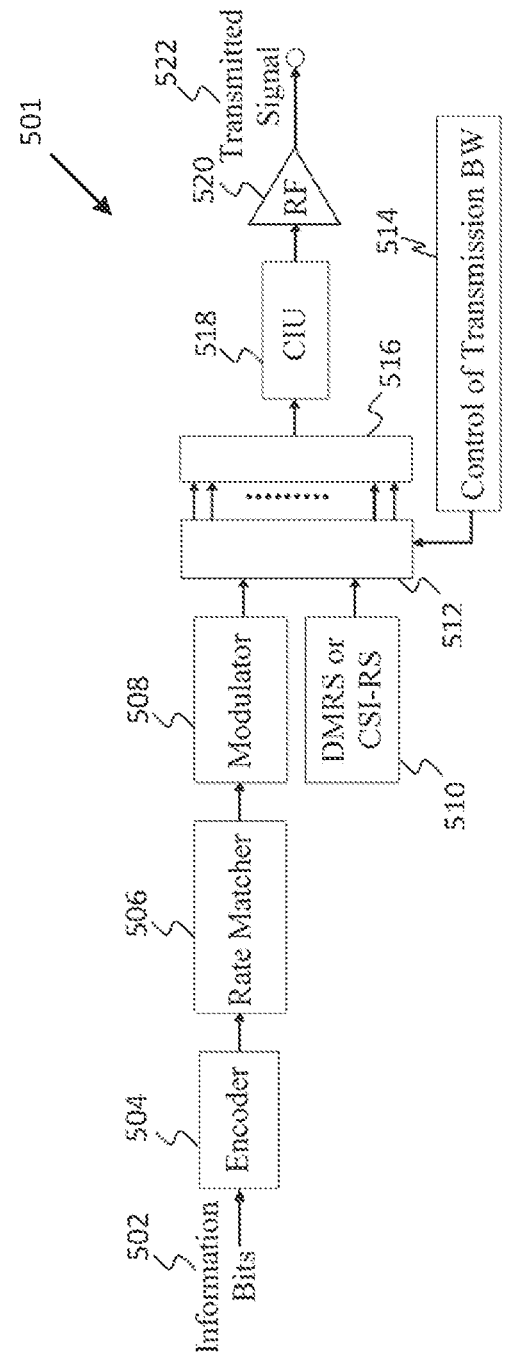
FIG. 5A illustrates an example transmitter structure according to various embodiments of the present disclosure.

FIG. 5A illustrates an example transmitter structure according to various embodiments of the present disclosure. The example transmitter structure 501 illustrated in FIG. 5A is for illustration only and should not be construed as limiting. FIG. 5A does not limit the scope of the present disclosure to any particular transmitter structure. One or more of the components illustrated in FIG. 5A can be implemented in specialized circuitry configured to perform the noted functions or one or more of the components can be implemented by one or more processors executing instructions to perform the noted functions. For example, the transmitter structure 500 can be implemented in a UE 111-116 or a gNB 101-103 that implements the transmit path 200. Other embodiments can be used without departing from the scope of the present disclosure.

Information bits, such as control bits or data bits 502, are encoded by an encoder 504, rate matched to assigned time/frequency resources by a rate matcher 506 and modulated by a modulator 508. Subsequently, modulated encoded symbols and DMRS 510 are mapped to SCs 512 by SC mapping unit 514, an inverse fast Fourier transform (IFFT) is performed by filter 516, a cyclic prefix (CP) is added by CP insertion unit 518, and a resulting signal 522 is filtered by a filter and transmitted by a radio frequency (RF) unit 520.

Figure 5B:
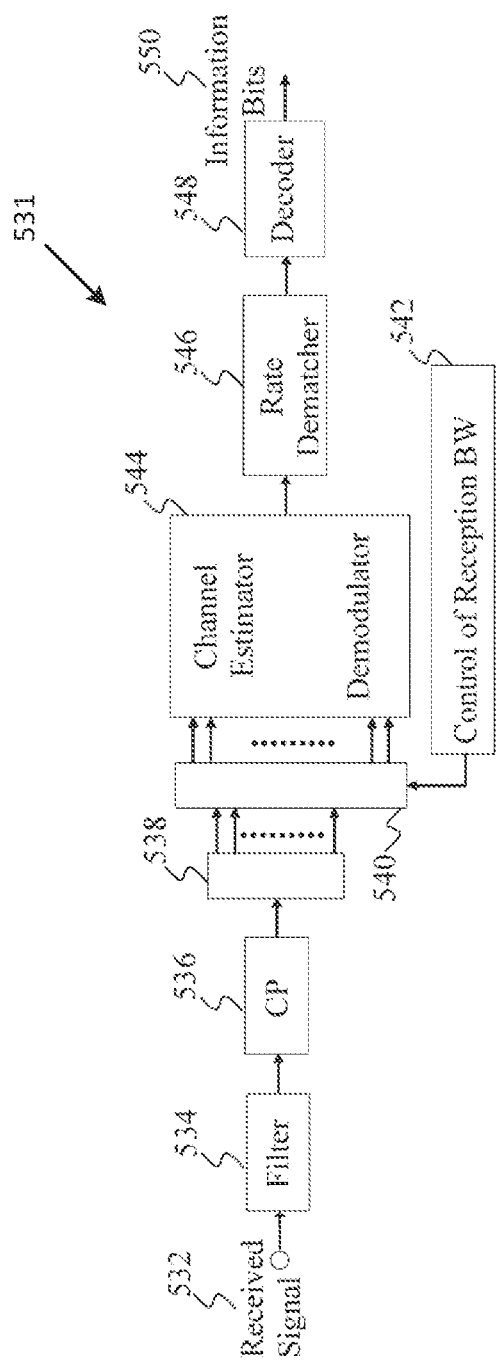
FIG. 5B illustrates an example receiver structure according to various embodiments of the present disclosure.

FIG. 5B illustrates example receiver structure using OFDM according to various embodiments of the present disclosure. The example receiver structure 531 illustrated in FIG. 5B is for illustration only and should not be construed as limiting. FIG. 5B does not limit the scope of the present disclosure to any particular receiver structure. One or more of the components illustrated in FIG. 5B can be implemented in specialized circuitry configured to perform the noted functions or one or more of the components can be implemented by one or more processors executing instructions to perform the noted functions. For example, the receiver structure 531 can be implemented in a UE 111-116 or a gNB 101-103 that implements the receive path 250. Other embodiments can be used without departing from the scope of the present disclosure.

As illustrated in FIG. 5B, a received signal 532 is filtered by filter 534, a CP removal unit 536 removes a CP, a filter 538 applies a fast Fourier transform (FFT), SCs de-mapping unit 540 de-maps SCs selected by BW selector unit 542, received symbols are demodulated by a channel estimator and a demodulator unit 544, a rate de-matcher 546 restores a rate matching, and a decoder 548 decodes the resulting bits to provide information bits 550.

Various embodiments of the present disclosure recognize that a PUCCH can be transmitted according to multiple PUCCH formats. A PUCCH format corresponds to a structure that is designed for a particular range of numbers of transmission symbols or of numbers of UCI bits as different number of UCI bits use different PUCCH transmission structures to improve an associated UCI BLER. For example, a UE can use a PUCCH format 1 for transmission of 2 UCI/HARQ-ACK bits (and a SR bit by selecting a PUCCH resource for SR transmission in case of positive SR) or a PUCCH format 3 or 4 for transmission of more than 2 UCI bits. A transmission duration for a PUCCH format 1, 3, or 4 can range from 4 to 14 symbols. For example, a UE can use a PUCCH format 0 for transmission of 2 UCI/HARQ-ACK bits or a PUCCH format 2 for transmission of more than 2 UCI bits. A transmission duration for a PUCCH format 0 or 2 can range from 1 to 2 symbols. A PUCCH transmission is also associated with a transmission configuration indicator (TCI) state providing a spatial domain filter for a PUCCH transmission.

Various embodiments of the present disclosure recognize that 5G networks provide flexibility for a number of UL symbols in a slot and the use of various subcarrier spacing (SCS) values, including but not limited to 15 kHz and 60 kHz. Existence of a PUCCH transmission over a few UL symbols or with a larger SCS value can result in a reduced total received energy relative to a PUCCH transmission over more UL symbols or with a smaller SCS value. Accordingly, various embodiments of the present disclosure provide a UE with an adjustable number of repetitions for a PUCCH transmission over a corresponding number of slots to enable more reliable receptions of PUCCH transmissions while avoiding an unnecessarily large number of repetitions.

For example, when a UE is not power limited, the UE can compensate for a reduced number of slot symbols for a PUCCH transmission or for a larger SCS value by increasing a PUCCH transmission power. For example, in PUCCH transmission occasion i, a UE, for example any one of the UEs 111-116, can determine a PUCCH transmission power $P_{PUCCH,b,f,c}(i, q_u, q_d, l)$ on an active UL BWP b of carrier f in a cell c using PUCCH power control adjustment state with index l as in Equation 1 where μ is the SCS configuration corresponding to a SCS value of $2^\mu$. 15 kHz (μ=0 for SCS of 15 kHz) and $\Delta_{TF,b,f,c}(i)$ is a PUCCH transmission power adjustment component that accounts for a number of available resources for the PUCCH transmission during occasion i.

Equation 1

$$P_{PUCCH,b,f,c}(i, q_u, q_d, l) = \min \begin{Bmatrix} P_{CMAX,f,c}(i), \\ P_{O\_PUCCH,b,f,c}(q_u) + 10\log_{10}(2^\mu \cdot M_{RB,b,f,c}^{PUCCH}(i)) + \\ PL_{b,f,c}(q_d) + \Delta_{F\_PUCCH}(F) + \Delta_{TF,b,f,c}(i) + g_{b,f,c}(i, l) \end{Bmatrix} [dBm]$$

For PUCCH format 1, $$\Delta_{TF,b,f,c}(i) = 10\log_{10}\left(\frac{N_{ref}^{PUCCH}}{N_{symb}^{PUCCH}}\right), \text{ where } N_{ref}^{PUCCH} = N_{symb}^{slot}, N_{symb}^{slot}$$

is a number of symbols per slot, and $N_{symb}^{PUCCH}$ is a number of PUCCH transmission symbols. For PUCCH format 3 or PUCCH format 4 and for $O_{UCI} = n_{HARQ-ACK} + O_{SR} + O_{CSI} \leq 11$ bits, $\Delta_{TF,b,f,c}(i) = 10 \log_{10} (K_1 \cdot (n_{HARQ-ACK} + O_{SR} + O_{CSI})/N_{RE})$ where $K_1 = 6$, $n_{HARQ-ACK}$ is a number of actual HARQ-ACK information bits that the UE determines, $O_{SR}$ is a number of SR information bits, $O_{CSI}$ is a number of CSI information bits, and $N_{RE}$ is a number of REs for UCI transmission. For PUCCH format 3 or PUCCH format 4 and for $O_{UCI} = O_{HARQ-ACK} + O_{SR} + O_{CSI} > 11$ bits, $\Delta_{TF,b,f,c}(i) = 10 \log_{10}((2^{K_2 \cdot BPRE} - 1))$, $K_2 = 2.4$, $BPRE = (O_{ACK} + O_{SR} + O_{CSI} + O_{CRC})/N_{RE}$, and $O_{ACK}$ is a total number of HARQ-ACK information bits that the UE determines.

In various embodiments, a gNB, for example any one of the gNBs 101-103, determines that a UE, for example any one of the UEs 111-116, cannot increase a transmission power to achieve a desired UCI reception reliability for a PUCCH transmission over a number of symbols in a slot. In these embodiments, the gNB can configure the UE with a number of repetitions for a PUCCH transmission over the number of symbols in a respective number of slots in order to increase a time for a PUCCH reception and increase a total PUCCH reception energy. The configuration for the number of repetitions can be per PUCCH format. As a particular transmission power of a PUCCH depends on a number of UCI bits included in the PUCCH, a number of repetitions for a PUCCH transmission from a UE that cannot increase a PUCCH transmission power should depend on the number of UCI bits included in the PUCCH.

In various embodiments, the reception points at a gNB, for example any one of the gNBs 101-103, can dynamically change due to the UE mobility or due a variation in a corresponding channel medium. For example, a current TCI state for a PUCCH reception can become suboptimal and a new TCI state may not be immediately available. In this embodiment, the gNB can use a suboptimal TCI state, corresponding, for example, to a wide beam, for a PUCCH reception and experience a reduced signal-to-noise and interference ratio (SINR) for the PUCCH reception. For example, a PUCCH can be dynamically received from one reception point or from multiple reception points and, in the latter case, a SINR for the PUCCH reception can increase. In order to enable a gNB to receive a UCI in a PUCCH with a desired reliability, the gNB can dynamically adjust a PUCCH transmission power from the UE. When the UE is power limited, the gNB should be provided with such a capability by dynamically adjusting a number of repetitions for a PUCCH transmission from a UE. Similar to the reception points, the transmission points at a gNB can dynamically change and a different TCI state can be indicated for different PDSCH transmissions.

Accordingly, various embodiments of the present disclosure enable the adjustment of a number of repetitions for a PUCCH transmission based on one or more of a number of UCI bits conveyed by the PUCCH transmission, a SCS for the PUCCH transmission, a TCI state of a PUCCH transmission, or a TCI state of a PDSCH reception.

For example, a gNB, for example any one of the gNB 101, gNB 102, or gNB 103, can provide by higher layer signaling to a UE, for example any one of the UEs 111-116, a reference number of repetitions $N_{PUCCH}^{repeat,ref}$ for a PUCCH transmission. The reference number of repetitions $N_{PUCCH}^{repeat,ref}$ can be common to all PUCCH formats or can be separately provided for each a PUCCH format such as PUCCH format 1 used for transmission of up to 2 UCI bits or PUCCH format 3 or 4 used for transmission of 3 or more UCI bits (and CRC bits, if any). A UE that transmits a PUCCH with repetitions can maintain a same PUCCH transmission power across all repetitions, or at least across repetitions over a continuous time interval, instead of, when possible, adjusting a PUCCH transmission power between repetitions of a same PUCCH transmission based on received TPC command values for PUCCH. The reference number of repetitions can also be separately provided for each UCI type (HARQ-ACK, SR, CSI report) as different UCI types can have different target BLERs.

The reference number of repetitions $N_{PUCCH}^{repeat,ref}$ can be for a reference number of UCI bits $O_{UCI,ref}$ (including CRC bits, when applicable). For PUCCH format 1, the reference number of UCI bits $O_{UCI,ref}$ can be 1 or 2. The UCI is typically HARQ-ACK information. When the reference number of UCI bits is $O_{UCI,ref}=1$ and the UE is configured with a reference number of $N_{PUCCH}^{repeat,ref}$ repetitions, the UE determines a number of repetitions for 2 UCI bits as $2 \cdot N_{PUCCH}^{repeat,ref}$. In general, the number of repetitions for a PUCCH transmission is $N_{PUCCH}^{repeat}=O_{UCI} \cdot N_{PUCCH}^{repeat,ref}/O_{UCI,ref}=O_{UCI} \cdot N_{PUCCH}^{repeat,ref}$, where $O_{UCI}$ is the number of UCI bits in the PUCCH transmission. When the reference number of UCI bits is $O_{UCI,ref}=2$ and the UE is configured with a reference number of $N_{PUCCH}^{repeat,ref}$ repetitions, the UE determines a number of repetitions for 1 UCI bit as $N_{PUCCH}^{repeat}=O_{UCI} \cdot N_{PUCCH}^{repeat,ref}/O_{UCI,ref}=O_{UCI} \cdot N_{PUCCH}^{repeat,ref}/2$. In general, the number of repetitions for a PUCCH transmission is $N_{PUCCH}^{repeat}=O_{UCI} \cdot N_{PUCCH}^{repeat,ref}/O_{UCI,ref}$, or $N_{PUCCH}^{repeat}=\lceil N_{PUCCH}^{repeat,ref} \cdot O_{UCI}/O_{UCI,ref} \rceil$ if $O_{UCI,ref}=2$ and $N_{PUCCH}^{repeat,ref}$ is not a multiple of 2.

For PUCCH format 3 or 4, the reference number of UCI bits $O_{UCI,ref}$ can be 3 or larger. Considering that a power adjustment factor as a function of the number of UCI bits is $\Delta_{TF,b,f,c}(i)=10 \log_{10}(K_1 \cdot O_{UCI}/N_{RE})$, when the number of UCI bits is $3 \le O_{UCI} \le 11$, an equivalent number of repetitions for a PUCCH transmission based on the number of UCI bits can be derived. When the reference number of UCI bits is $O_{UCI,ref}=3$, an adjustment of a number of PUCCH repetitions for a number of $O_{UCI}$ bits is $N_{PUCCH}^{repeat}=\lceil N_{PUCCH}^{repeat,ref} \cdot O_{UCI}/O_{UCI,ref} \rceil = \lceil N_{PUCCH}^{repeat,ref} \cdot O_{UCI}/3 \rceil$. When a number of reference UCI bits is $O_{UCI,ref}=11$, an adjustment of a number of PUCCH repetitions is $N_{PUCCH}^{repeat}=\lceil N_{PUCCH}^{repeat,ref} \cdot O_{UCI}/O_{UCI,ref} \rceil = \lceil N_{PUCCH}^{repeat,ref} \cdot O_{UCI}/11 \rceil$. For a number of UCI bits larger than 11, using as reference a power adjustment factor $\Delta_{TF,b,f,c}(i)=10 \log_{10}((2^{K_2 \cdot BPRE}-1))$, a number of repetitions $N_{PUCCH}^{repeat}$ for a PUCCH transmission with a number of $O_{UCI}$ bits can be determined as $N_{PUCCH}^{repeat}=\lceil N_{PUCCH}^{repeat,ref} \cdot (2^{K_2 \cdot BPRE}-1)/(2^{K_2 \cdot BPRE,ref}-1) \rceil$, where $BPRE=O_{UCI}/N_{RE}$ and $BPRE,ref=O_{UCI,ref}/N_{RE}$. The number of UCI bits can correspond to a single UCI type, such as $n_{HARQ-ACK}$ HARQ-ACK information bits, or to multiple UCI types such as to $O_{SR}+O_{CSI}$ information bits. When CRC bits exist, $O_{UCI}$ is replaced by $O_{UCI}+O_{CRC}$ (and $O_{UCI,ref}$ either includes $O_{CR}c$ bits or $O_{CR}c$ bits are added to the $O_{UCI,ref}$ in the above expressions).

Figure 6:
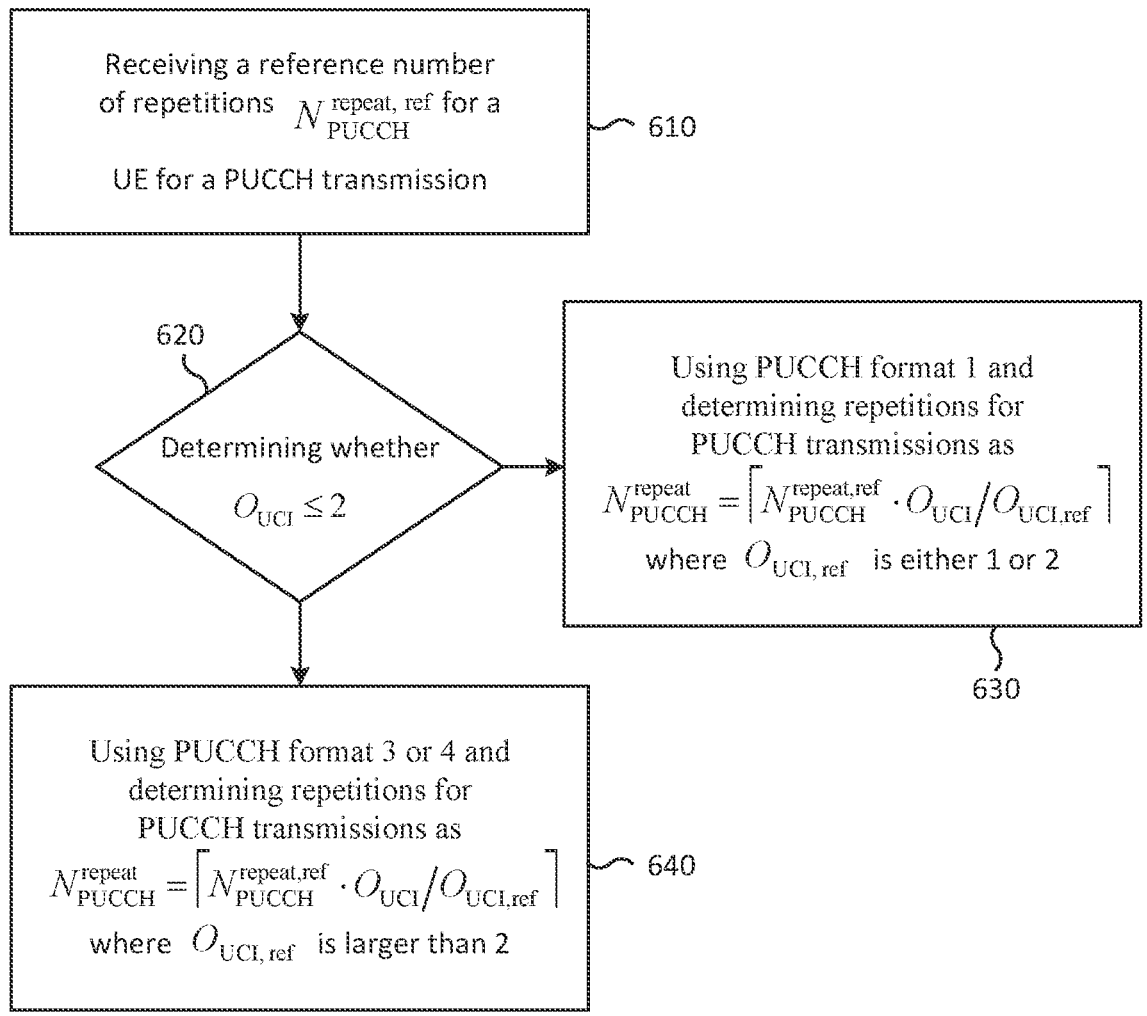
FIG. 6 illustrates a method of determining a number of repetitions of a PUCCH transmission according to various embodiments of the present disclosure.

FIG. 6 illustrates a method of determining a number of repetitions of a PUCCH transmission according to various embodiments of the present disclosure. More particularly, FIG. 6 illustrates a determination for a number of repetitions of a PUCCH transmission based on a number of repetitions provided by higher layers for a reference number of UCI bits according to various embodiments of the present disclosure. Although described herein as being implemented by the UE 116, the method illustrated in FIG. 6 can be implemented by one or more of the UEs 111-116 and a corresponding method can be performed by one or more of the gNBs 101-103 described in FIG. 1. Other embodiments can be used without departing from the scope of the present disclosure.

In step 610, the UE 116 receives, for each PUCCH format supporting repetitions of a PUCCH transmission or a common for all PUCCH formats supporting repetitions of a PUCCH transmission, a reference number of repetitions $N_{PUCCH}^{repeat,ref}$ for a PUCCH transmission. The antenna 305 can receive the reference number of repetitions from higher layer signaling from a gNB, such as the gNB 102. The UE 116 can store the reference number of repetitions in the memory 360. The reference number of repetitions $N_{PUCCH}^{repeat,ref}$ refers to a PUCCH transmission with a reference number of UCI bits $O_{UCI,ref}$ that is also provided by higher layers or is predetermined in the specification and stored in the memory 360 for each PUCCH format.

In operation 620, the UE 116 determines whether $O_{UCI} \le 2$. When $O_{UCI} \le 2$, the processor 340 proceeds to operation 630. When $O_{UCI} > 2$, the processor 340 proceeds to operation 640.

In operation 630, where the UE 116 has determined $O_{UCI} \le 2$, the UE 116 utilizes a PUCCH format 1 and determines a number of repetitions for the PUCCH transmission as $N_{PUCCH}^{repeat}=\lceil N_{PUCCH}^{repeat,ref} \cdot O_{UCI}/O_{UCI,ref} \rceil$ where $O_{UCI,ref}$ is either 1 or 2. In contrast, in operation 640, where the UE 116 has determined $O_{UCI} > 2$, the UE 116 utilizes a PUCCH format 3 or 4 and determines a number of repetitions for the PUCCH transmission as $N_{PUCCH}^{repeat}=\lceil N_{PUCCH}^{repeat,ref} \cdot O_{UCI}/O_{UCI,ref} \rceil$ where $O_{UCI,ref}$ is larger than 2.

The reference number of repetitions $N_{PUCCH}^{repeat,ref}$ can also be independent of a PUCCH format or of a UCI payload and an actual number of PUCCH repetitions $N_{PUCCH}^{repeat}$ can be adjusted, for example to account for a UCI payload, by a field in a DCI format triggering a corresponding PUCCH transmission. For example, $N_{PUCCH}^{repeat}=N_{PUCCH}^{repeat,ref} \cdot f$, where f is provided by a DCI format triggering the PUCCH transmission from a UE, such as a DCI format that the UE detects in a last PDCCH reception associated with the PUCCH transmission when the PUCCH includes HARQ-ACK information associated with multiple PDCCH receptions providing DCI formats scheduling respective PDSCH receptions. For example, for a field that includes 2 bits for scaling $N_{PUCCH}^{repeat,ref}$, values of f can be 0.5, 1, 2, 4. It is also possible that instead of a scaling of a reference number of repetitions, the field in the DCI format instead directly provides the actual number of repetitions for a PUCCH transmission or an index to a set of a configured number of repetitions for a PUSCH transmission. Then, for example for a field that includes 2 bits, values of f can be 1, 2, 4, 8. For example, for a set of numbers of repetitions of a PUCCH transmissions that is provided by higher layers and includes four values, $\{N_{PUCCH}^{repeat,1}, N_{PUCCH}^{repeat,2}, N_{PUCCH}^{repeat,3}, N_{PUCCH}^{repeat,4}\}$, a field that includes 2 bits can indicate one of the four values from the set.

Various embodiments of the present disclosure recognize that a number of repetitions for a PUCCH transmission can be determined as a function of a SCS for the PUCCH transmission. For example, a UE, such as one or more of the UEs 111-116, can include a number of bandwidth parts (BWPs) for receptions (DL BWPs) or transmissions (UL BWPs). The UE 116 can switch an active BWP based on an indication by a DL DCI format or an UL DCI format, or based on a timer, or based on an indication by higher layers. The UE 116 can use a different SCS configuration μ, where for example μ=0, 1, 2, 3, 4 for transmissions in different UL BWPs. A transmission in an UL BWP can be performed with an SCS=$(2^\mu \times 15)$ kHz. As a symbol duration depends on the associated SCS, a number of repetitions for a PUCCH transmission, and in general for any transmission, also depends on the SCS just as a total received power at a serving gNB depends on the reception duration.

Figure 7:
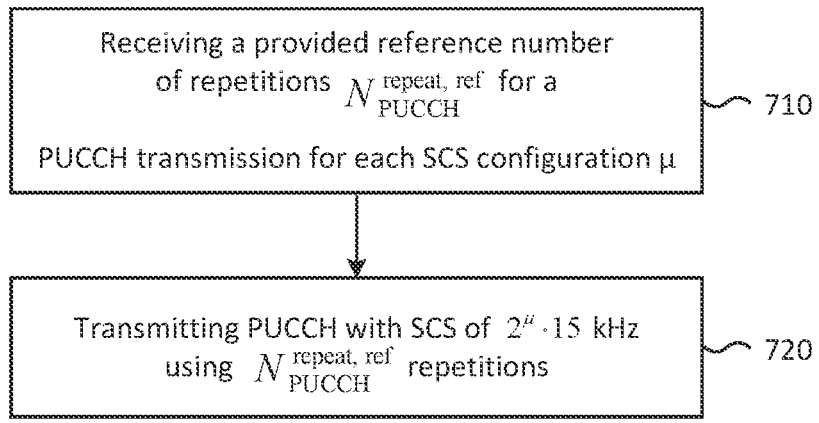
FIG. 7 illustrates a method of determining a number of repetitions of a PUCCH transmission according to various embodiments of the present disclosure.

For example. FIG. 7 illustrates a method of determining a number of repetitions of a PUCCH transmission according to various embodiments of the present disclosure. More particularly, FIG. 7 illustrates a method of determining a number of repetitions of a PUCCH transmission based on a number of repetitions provided by higher layers for each SCS configuration according to this disclosure. Although described herein as being implemented by the UE 116, the method illustrated in FIG. 7 can be implemented by one or more of the UEs 111-116 and a corresponding method can be performed by one or more of the gNBs 101-103 described in FIG. 1. Other embodiments can be used without departing from the scope of the present disclosure.

In step 710, the UE 116 receives, possibly for each PUCCH format supporting repetitions of a PUCCH transmission, a reference number of repetitions $N_{PUCCH}^{repeat,\mu}$ for a PUCCH transmission for each SCS configuration $\mu$. The UE 116 can receive the reference number of repetitions from higher layers, for example, from the gNB 102. The reference number of repetitions can be stored in the memory 360 of the UE 116. The configuration can be per UL BWP that the UE 116 is configured for, or can be per SCS configuration $\mu$. For example, the UE can receive a reference number $N_{PUCCH}^{repeat,0}=2$, $N_{PUCCH}^{repeat,1}=4$, $N_{PUCCH}^{repeat,2}=7$, and so on. When a configured UL BWP is the active UL BWP where the UE 116 transmits at a given time, the UE 116 can determine a number of repetitions for the PUCCH transmission according to a corresponding configuration for the UL BWP or according to the SCS configuration of the active UL BWP.

In operation 720, the UE 116 transmits a PUCCH with SCS=$(2^\mu \times 15)$ kHz using $N_{PUCCH}^{repeat,\mu}$ repetitions. For example, when the UE 116 transmits the PUCCH in an UL BWP with SCS configuration $\gamma=0$, the UE 116 applies $N_{PUCCH}^{repeat,0}=2$ repetitions. When the UE 116 transmits the PUCCH in an UL BWP with SCS configuration $\mu=2$, the UE 116 applies $N_{PUCCH}^{repeat,\mu}=7$ repetitions.

In another embodiment, the UE 116 can receive a reference number of repetitions $N_{PUCCH,ref}^{repeat,\mu_{ref}}$ for a PUCCH transmission for a reference SCS configuration $\mu_{ref}$, such as $\mu_{ref}=0$ or $\mu_{ref}=2$. The reference number of repetitions can be per reference value of $\mu$ per corresponding frequency range (FR). In this embodiment, the UE 116 can determine a reference number of repetitions $N_{PUCCH,ref}^{repeat,\mu}$ for a PUCCH transmission with SCS configuration $\mu$ as $N_{PUCCH,ref}^{repeat,\mu}=\lceil N_{PUCCH,ref}^{repeat,\mu_{ref}} \cdot 2^\mu/2^{\mu_{ref}} \rceil$ or, if $\mu_{ref}=0$, as $N_{PUCCH,ref}^{repeat,\mu}=N_{PUCCH,ref}^{repeat,\mu_{ref}} \cdot 2^\mu/2^{\mu_{ref}}$.

Figure 8:
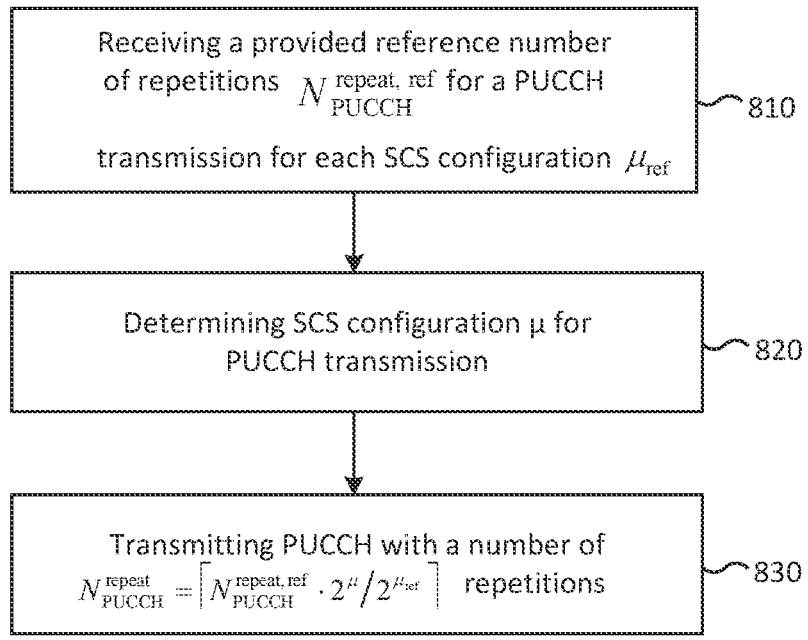
FIG. 8 illustrates a method of determining a number of repetitions of a PUCCH transmission according to various embodiments of the present disclosure.

FIG. 8 illustrates a method of determining a number of repetitions of a PUCCH transmission according to various embodiments of the present disclosure. More particularly, FIG. 8 illustrates a method of determining a number of repetitions of a PUCCH transmission based on a reference number of repetitions provided by higher layers for a reference SCS according to this disclosure. Although described herein as being implemented by the UE 116, the method illustrated in FIG. 8 can be implemented by one or more of the UEs 111-116 and a corresponding method can be performed by one or more of the gNBs 101-103 described in FIG. 1. Other embodiments can be used without departing from the scope of the present disclosure.

In operation 810, the UE 116 receives, for each PUCCH format supporting repetitions of a PUCCH transmission, a reference number of repetitions $N_{PUCCH,ref}^{repeat,\mu_{ref}}$ for a PUCCH transmission for each SCS configuration $\mu_{ref}$. The UE 116 can receive the reference number of repetitions from a higher layer signaling, such as from the gNB 102. The reference number of repetitions can be stored in the memory 360 of the UE 116.

In operation 820, the UE 116 determines a SCS configuration $\mu$ for the PUCCH transmission. In operation 830, based on the determined SCS configuration $\mu$, the UE 116 transmits the PUCCH with a number of $N_{PUCCH,ref}^{repeat,\mu}=\lceil N_{PUCCH,ref}^{repeat,\mu_{ref}} \cdot 2^\mu/2^{\mu_{ref}} \rceil$ repetitions.

In general, when a UE determines an actual number of repetitions $N_{PUCCH}^{repeat,\mu_{ref}}$ for a PUCCH transmission for SCS configuration $\mu_{ref}$, the UE can determine an actual number of repetitions $N_{PUCCH}^{repeat,\mu}$ for the PUCCH transmission for SCS configuration $\mu$ as $N_{PUCCH}^{repeat,\mu}=\lceil N_{PUCCH}^{repeat,\mu_{ref}} \cdot 2^\mu/2^{\mu_{ref}} \rceil$, or as $N_{PUCCH}^{repeat,\mu}=N_{PUCCH}^{repeat,\mu_{ref}} \cdot 2^\mu/2^{\mu_{ref}}$ when $N_{PUCCH}^{repeat,\mu_{ref}} \cdot 2^\mu/2^{\mu_{ref}}$ is an integer. The determination of the actual number of repetitions for a PUCCH transmission can be based on any of the previously described methods including based on formulas considering the number of UCI bits or on indication by a field in a DCI format triggering the PUCCH transmission.

Various embodiments of the present disclosure recognize that a number of repetitions for a PUCCH transmission can be determined as a function of a transmission configuration indicator (TCI) state for the PUCCH transmission. Different TCI states are associated with different characteristics such as a "beam-width" for a corresponding transmitted/received signal. A smaller beam-width results in the received energy in the spatial domain being more concentrated and the SINR being larger. Therefore, a TCI state associated with a larger, i.e. wider, beam-width can use a different. i.e. larger, number of repetitions for a signal transmission, such as for a PUCCH transmission, than a TCI state associated with a smaller beam-width. Accordingly, various embodiments of the present disclosure determine a number of repetitions for a PUCCH transmission as a function of a TCI state for the PUCCH transmission.

Figure 9:
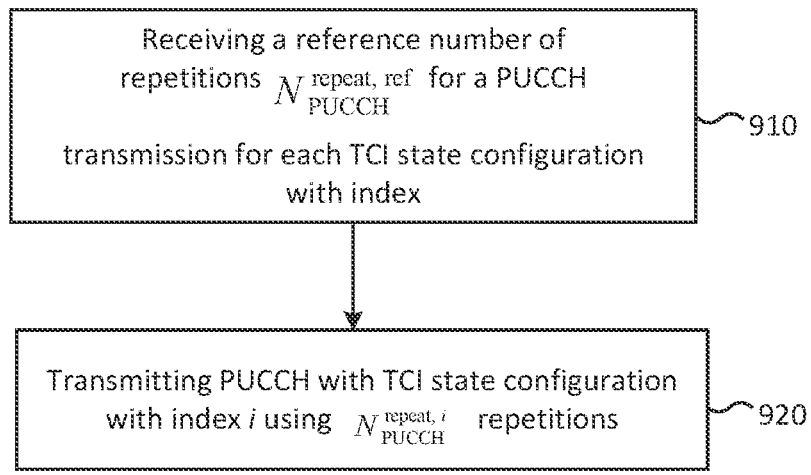
FIG. 9 illustrates a method of determining a number of repetitions of a PUCCH transmission according to various embodiments of the present disclosure.

For example, FIG. 9 illustrates a method of determining a number of repetitions of a PUCCH transmission according to various embodiments of the present disclosure. More particularly, FIG. 9 illustrates a method of determining a number of repetitions of a PUCCH transmission based on a number of repetitions provided by higher layers for each TCI state according to this disclosure. Although described herein as being implemented by the UE 116, the method illustrated in FIG. 9 can be implemented by one or more of the UEs 111-116 and a corresponding method can be performed by one or more of the gNBs 101-103 described in FIG. 1. Other embodiments can be used without departing from the scope of the present disclosure.

As illustrated in FIG. 9, when a UE 116 receives a set of TCI states, the UE 116 can also receive or, in general, determine a number of repetitions for a signal transmission according to each of the TCI states. The UE 116 can receive the reference number of repetitions by higher layer signaling. The reference number of repetitions can be stored in the memory 360. Then, the UE 116 can apply the number of repetitions for the signal transmission with a corresponding TCI state.

In operation 910, a UE 116 receives or determines, for each PUCCH format supporting repetitions of a PUCCH transmission, a number of repetitions $N_{PUCCH}^{repeat,i}$ for a PUCCH transmission for each corresponding TCI state configuration with index i. As noted above, the UE 116 can receive a reference number of repetitions from the gNB 102 and the UE 116 can use the reference number to determine an actual number of repetitions for the PUCCH transmission, or the UE can be explicitly indicated a number of repetitions for a PUCCH transmission by a field in a DCI format and the UE can interpret a value of the field according to an associated TCI state of the PUCCH transmission. A configuration providing a reference number or a set of number of repetitions for a PUCCH transmission for each TCI state can be provided to the UE 116 from gNB 102 by higher layer signaling and the UE 116 can determine a number of repetitions for the PUCCH transmission based on the indicated TCI state for the PUCCH transmission. In operation 920, the UE 116 transmits a PUCCH with TCI state configuration with index i using $N_{PUCCH}^{repeat,i}$ repetitions.

In another embodiment, a UE, such as one or more of the UEs 111-116, can receive a set of pairs of {a reference number of repetitions, a TCI state for a signal transmission}. The UE 116 can receive the reference number of repetitions by higher layer signaling from gNB 102. The reference number of repetitions can be stored in the memory 360 of UE 116. The UE 116 can then transmit a signal with a TCI state from a set of configured TCI states and apply a number of repetitions that is determined from the reference number of repetitions associated with the TCI state.

The indication of the TCI state can be explicit through a field in a DCI format, or implicit through an association with a TCI state of a Control Resource SET (CORESET) where the UE receives a PDCCH that provides a DCI format triggering a PUCCH transmission, or explicit by higher layers such as by a medium access control (MAC) control element (CE) or radio resource control (RRC) signaling. The UE 116 can determine an actual number of repetitions for the PUCCH transmission based on a mapping provided by higher layers between the TCI state and the reference number of repetitions as previously described. As another example, the UE 116 can receive a higher layer parameter PUCCH-SpatialRelationInfo that includes a mapping between a set of pucch-SpatialRelationInfoId TCI states for a PUCCH transmission and a reference number of repetitions for the PUCCH transmission. As yet another example, the UE 116 can receive a higher layer parameter PUCCH-PathlossReferenceRS that includes a mapping between a DL RS index, such as a SS/PBCH block index or a CSI-RS resource index, that the UE 116 uses to obtain a path-loss estimate and a reference number of repetitions for a PUCCH transmission. As a fourth example, for HARQ-ACK information, a DL DCI format scheduling an associated PDSCH reception can include a field that explicitly or implicitly indicates a TCI state for the PUCCH transmission with the HARQ-ACK information. For example, the DCI format can include a field that indicates a PUCCH resource for the PUCCH transmission and higher layer signaling can provide in advance an association of the PUCCH resource with a TCI state. For example, a TCI state determining a spatial filter for a PUCCH transmission can be part of a configuration of a set of resources for the PUCCH transmission and the DCI format can indicate one resource from the set of resources. The UE can then determine an actual number of repetitions for the PUCCH transmission through an association between a reference number of repetitions and the TCI state. As previously described, the determination of the actual number of repetitions for the PUCCH transmission can be based on the reference number of repetitions and on one or more of a number of UCI bits, a SCS configuration for the PUCCH transmission, an index to a configured set of numbers of repetitions by a field in the DCI format, and a scaling factor of the reference number of repetitions that is provided by a field in the DCI format.

In another embodiment, when a MAC CE activates one TCI state from a set of configured TCI states, the MAC CE can also include a field indicating a number of repetitions for a signal transmission such as a PUCCH transmission.

For a HARQ-ACK multiplexing in PUSCH transmission that includes a transport block, a number of coded modulation symbols per layer for HARQ-ACK multiplexing, denoted as $Q'_{ACK}$, can be determined, for example, as in Equation 2.

$$Q'_{ACK} = \min\left\{ \left\lceil \frac{(O_{ACK} + L_{ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \right.$$
$$\left. \left\lceil \alpha \cdot \sum_{l=0}^{N_{symb,all}^{PUSCH}-1} M_{sc}^{UCI}(l) \right\rceil \right\}$$

Equation 2

As shown in Equation 2:
$O_{ACK}$ is the number of HARQ-ACK bits;
if $O_{ACK} \geq 360$, $L_{ACK}=11$; otherwise $L_{ACK}$ is the number of CRC bits for HARQ-ACK information bits;
$\beta_{offset}^{PUSCH} = \beta_{offset}^{HARQ-ACK}$ is provided by higher layers or indicated by a DCI format scheduling the PUSCH transmission from a set of values provided by higher layers;
$C_{UL-SCH}$ is the number of code blocks for the transport block of the PUSCH transmission;
$K_r$ is the r-th code block size for transport of the PUSCH transmission;
$M_{sc}^{PUSCH}$ is the scheduled bandwidth of the PUSCH transmission, expressed as a number of subcarriers;
$M_{sc}^{PT-RS}(l)$ is the number of subcarriers in OFDM symbol l that carries phase-tracking RS (PTRS), in the PUSCH transmission;
$M_{sc}^{UCI}(l)$ is the number of resource elements that can be used for transmission of UCI in OFDM symbol l, for l=0, 1, 2, . . . , $N_{symb,all}^{PUSCH}-1$, in the PUSCH transmission and $N_{symb,all}^{PUSCH}$ is the total number of OFDM symbols of the PUSCH, including all OFDM symbols used for DMRS;
for any OFDM symbol that carries DMRS of the PUSCH, $M_{sc}^{UCI}(l)=0$;
for any OFDM symbol that does not carry DMRS of the PUSCH, $M_{sc}^{UCI}(l) = M_{sc}^{PUSCH} - M_{sc}^{PT-RS}(l)$;
$\alpha$ is configured by higher layers;
$l_0$ is the symbol index of the first OFDM symbol that does not carry DMRS of the PUSCH, after the first DMRS symbol(s), in the PUSCH transmission.

For CSI part 1 multiplexing in a PUSCH transmission with a transport block, a number of coded modulation symbols per layer for CSI part 1 multiplexing, denoted as $Q'_{CSI-part1}$, can be determined, for example, as in Equation 3:

Equation 3

$$Q'_{CSI-1} =$$
$$\min\left\{ \left\lceil \frac{(O_{CSI-1} + L_{CSI-1}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \right.$$

-continued $$\left[\alpha \cdot \sum_{l=0}^{N_{symb,all}^{PUSCH}-1} M_{sc}^{UCI}(l)\right] - Q'_{ACK}\right\}$$

As shown in Equation 3:

$O_{CSI-1}$ is the number of bits for CSI part 1;

if OCS-1≥360, $L_{CSI-1}$=11; otherwise $L_{CSI-1}$ is the number of CRC bits for CSI part 1;

$\beta_{offset}^{PUSCH} = \beta_{offset}^{CSI-part1}$ is provided by higher layers or indicated by a DCI format scheduling the PUSCH transmission from a set of values provided by higher layers;

$Q'_{ACK}$ is the number of coded modulation symbols per layer for HARQ-ACK transmitted on the PUSCH if number of HARQ-ACK information bits is more than 2, and $Q'_{ACK} = \sum_{l=0}^{N_{symb,all}^{PUSCH}-1} \overline{M}_{sc,rvd}^{ACK}(l)$ if the number of HARQ-ACK information bits is no more than 2 bits, where $\overline{M}_{sc,rvd}^{ACK}(l)$ is the number of reserved resource elements for potential HARQ-ACK transmission in OFDM symbol l, for l=0, 1, 2, . . . , $N_{symb,all}^{PUSCH}-1$, in the PUSCH transmission; $M_{sc}^{UCI}(l)$ is the number of resource elements that can be used for transmission of UCI in OFDM symbol l, for l=0, 1, 2, . . . , $N_{symb,all}^{PUSCH}-1$, in the PUSCH transmission and $N_{symb,all}^{PUSCH}$ is the total number of OFDM symbols of the PUSCH, including all OFDM symbols used for DMRS;

for any OFDM symbol that carries DMRS of the PUSCH, $M_{sc}^{UCI}(l)=0$;

for any OFDM symbol that does not carry DMRS of the PUSCH, $M_{sc}^{UCI}(l) = M_{sc}^{PUSCH} - M_{sc}^{PT-RS}(l)$.

Various embodiments of the present disclosure recognize that 5G systems are able to support multiple service/priority types for a same UE, such as one or more of the UEs 111-116, or for different UEs, using BLER targets for data or control information that are different by orders of magnitude and using widely different latencies for a successful delivery of a transport block. The UE 116 can identify a service/priority type for an associated PDSCH reception or PUSCH/PUCCH transmission from a DCI format scheduling the PDSCH reception and an associated HARQ-ACK transmission in a PUCCH, or scheduling the PUSCH transmission. For example, for the UE 116 that supports multiple service/priority types, a DCI format can include a field indicating a service/priority type for a PUSCH transmission or for a PUCCH transmission with HARQ-ACK information, or the UE can be configured with a different C-RNTI for each service/priority type, or the DCI format size can be different depending on a service/priority type of an associated transmission.

In some embodiments, the UE 116 can simultaneously support transmission and reception for different service/priority types, such as for a broadband data service and an augmented/virtual reality service. In these embodiments, the UE 116 can transmit the UCI associated with a first service/priority type and drop transmission of the UCI associated with other service/priority types, transmit the UCI for all service/priority types, or transmit the UCI for some service/priority types and drop UCI for the remaining service/priority types.

In embodiments where the UE 116 drops transmission of the UCI associated with the other service types, for example of lower priority types, and the UCI is periodic/semi-persistent CSI or SR, the UE 116 can transmit the UCI at a next configured instance (if the UE 116 does not need to again drop transmission of the UCI). When the UE 116 drops transmission of the UCI associated with the other service types of lower priority and the UCI is HARQ-ACK information, a serving gNB, such as the gNB 101, gNB 102, or gNB 103, cannot obtain information associated with corresponding reception outcomes for TBs or for SPS PDSCH release. The gNB 102 reschedules the reception, by the UE 116, for the TBs or for the SPS PDSCH release thereby increasing a number of associated PDCCH and PDSCH resources for reception of same TBs or of SPS PDSCH release. It is therefore beneficial to enable the gNB 102 to trigger the UE 116 to retransmit HARQ-ACK information when the UE 116 had to drop a previous transmission of the HARQ-ACK information or, in general, when the gNB 102 did not correctly receive the HARQ-ACK information from the UE 116.

In embodiments where the UE 116 transmits UCI of multiple service/priority types, such as all or some of the service/priority types, the UE 116 needs to determine one or more PUCCH and/or PUSCH transmissions for multiplexing the UCI for the multiple service/priority types. When the PUCCH and/or PUSCH transmissions overlap in time, a multiplexing in a single PUCCH or a single PUSCH for the UCI that the UE 116 would otherwise transmit in different PUCCHs is subject to certain timeline conditions. Accordingly, various embodiments of the present disclosure identify at least one of PUCCH or PUSCH transmissions for the UE 116 to multiplex UCI for multiple service/priority types and determine rules for the UE 116 to multiplex UCI for multiple service/priority types in one PUCCH or PUSCH, including dropping transmission of the UCI for some of the multiple service/priority types.

In embodiments where the UE 116 supports simultaneous transmission and reception for different service/priority types with different reception reliability targets in terms of block error rate (BLER), the UE 116 can provide different CSI reports corresponding to the different BLER targets. For example, a CSI report can be configured by a higher layer parameter cqi-Table that determines an MCS table that can correspond to a different PDSCH reception BLER target that the UE 116 uses to determine a CQI report. A configuration of a single MCS table and a corresponding CSI report can be insufficient when the UE 116 supports transmission and reception for different service/priority types that have different target BLERs. Accordingly, various embodiments of the present disclosure enable a UE 116 to support transmission of different CSI reports for service/priority types having different target BLERs.

As described herein, a PUSCH transmission from the UE 116 can be with a number of repetitions that can be indicated by higher layer signaling or by a DCI format scheduling the PUSCH transmission. When UCI is multiplexed in a repetition from the number of repetitions of the PUSCH transmission, a same UCI reception reliability can be maintained irrespective of the number of repetitions. Accordingly, various embodiments of the present disclosure determine a number of REs for multiplexing UCI in a repetition of the PUSCH transmission with a number of repetitions so that UCI reception reliability (BLER) is independent of the number of repetitions.

As described herein, a CSI report from the UE 116 can be triggered by a DCI format, such as a DL DCI format that schedules a PDSCH reception by the UE 116, by a DCI format, such as an UL DCI format that schedules a PUSCH transmission from the UE 116, or by a DCI format that does not schedule a PDSCH reception by the UE 116 and does not schedule a PUSCH transmission from the UE such as a UE-group common (GC) DCI format that serves at least for triggering A-CSI reports from one or more UEs, such as the UEs 111-116, and a corresponding PDCCH with the GC-DCI format is received by the UEs 111-116 according to a common search space.

For a CSI report triggered by a DL DCI format, a same PUCCH or different PUCCHs can be used to transmit the CSI report and to transmit HARQ-ACK information associated with a PDSCH reception scheduled by the DL DCI format. If a different PUCCH is used, a corresponding resource can be indicated by a separate field in the DCI format or can be implicitly derived from the PUCCH resource used for the transmission of the HARQ-ACK information. If a same PUCCH is used, an ambiguity of the UCI payload in the PUCCH between the UE 116 and a serving gNB 102 can occur when the UE 116 fails to detect the DL DCI format triggering the CSI report. In such case, the gNB 102 assumes reception of a UCI payload that includes the CSI report while the UE 116 transmits a UCI payload that does not include the CSI report. Further, as the UE 116 determines a number of RBs for a PUCCH transmission, such as for achieving a UCI code rate that is smaller than or equal to a code rate provided to the UE 116 in advance by higher layers, there can also be an ambiguity between the UE 116 and the gNB 102 of the number of RBs used for the PUCCH transmission.

Accordingly, various embodiments of the present disclosure enable CSI report triggering by a DL DCI format and multiplexing of the CSI report and HARQ-ACK information in a same PUCCH while minimizing a probability for ambiguity between the gNB 102 and the UE 116 for a corresponding UCI payload and for a number of RBs that the UE 116 uses for the PUCCH transmission. In addition, various embodiments of the present disclosure enable CSI report triggering by a DL DCI format and multiplexing of the CSI report and HARQ-ACK information in respective PUCCH transmissions occurring over different PUCCH resources.

Accordingly, various embodiments of the present disclosure enable a gNB, such as one or more of the gNB 101, gNB 102, or gNB 103, to trigger re-transmission of HARQ-ACK information from a UE, such as one or more the UEs 111-116, when the gNB 102 did not correctly receive a previous transmission of the HARQ-ACK information from the UE 116. Various embodiments of the present disclosure further enable the UE 116 to multiplex UCI for multiple service/priority types in one or more multiple PUCCH or PUSCH transmissions. Various embodiments of the present disclosure provide criteria for the UE 116 to drop UCI of a same priority type when the UE 116 multiplexes UCI for multiple service/priority types in a PUCCH or a PUSCH transmission.

In addition, various embodiments of the present disclosure enable a UE to provide CSI reports for multiple service/priority types. Various embodiments of the present disclosure also provide a number of REs used for multiplexing UCI in a repetition of a PUSCH transmission having a number of repetitions in order to maintain a same target UCI BLER regardless of the number of repetitions. Further, various embodiments of the present disclosure enable the gNB 102 to use a DL DCI format to trigger a CSI report from the UE 116 in a PUCCH while reducing a probability for an ambiguity between the gNB 102 and the UE 116 for a UCI payload and a number of RBs the UE 116 uses for the PUCCH transmission.

As described herein, a UCI type, such as HARQ-ACK information or CSI, or data information in a PUSCH transmission can correspond to different service/priority types and include different attributes such as target reception reliability (target BLER) and latency. UCI multiplexing in a PUSCH considers the different attributes of the UCI or the PUSCH. A UE, such as one or more of the UE 111-116, can generate HARQ-ACK information in response to reception of a transport block in a PDSCH or in response to reception of a SPS PDSCH release by a DCI format in a PDCCH. A DCI format scheduling a PDSCH reception or a SPS PDSCH release by the UE is referred to herein as a DL DCI format while a DCI format scheduling a PUSCH transmission from the UE is referred to herein as a UL DCI format.

Figure 10:
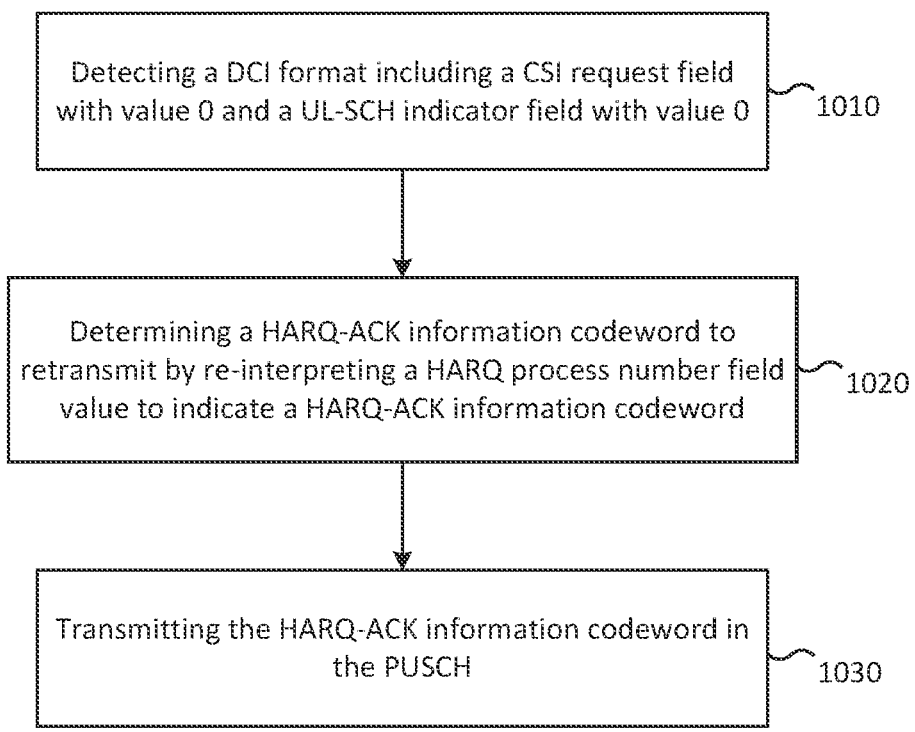
FIG. 10 illustrates a method of multiplexing HARQ-ACK information in a PUSCH transmission according to various embodiments of the present disclosure.

FIG. 10 illustrates a method of multiplexing HARQ-ACK information in a PUSCH transmission according to various embodiments of the present disclosure. Although described herein as being implemented by the UE 116, the method illustrated in FIG. 10 can be implemented by one or more of the UEs 111-116 and a corresponding method can be performed by one or more of the gNBs 101-103 described in FIG. 1. Other embodiments can be used without departing from the scope of the present disclosure.

Embodiments of the present disclosure recognize support of retransmissions of HARQ-ACK information from a UE 116 to a serving gNB 102. Retransmissions can result from a previous transmission of the HARQ-ACK information being dropped by the UE 116, for example due to a simultaneous transmission of other channels or signals from the UE 116 where multiplexing of the HARQ-ACK information was not possible, or not being received correctly by the gNB 102. For example, the gNB 102 can determine a discontinuous transmission (DTX) of HARQ-ACK information or can determine an incorrect reception based on an associated check for a cyclic redundancy check (CRC) appended to a codeword that includes the HARQ-ACK information.

As described herein, a DCI format scheduling a PUSCH transmission from the UE 116 can include a CSI request field and a 1-bit UL-SCH indicator field indicating whether or not the UE 116 transmits an UL shared channel (UL-SCH) in the PUSCH. When the UL-SCH indicator field value is a binary 0, the UE 116 expects the CSI request field to indicate multiplexing of one or more CSI reports in the PUSCH.

As described herein, a retransmission of HARQ-ACK information codeword by the UE 116 can be in a PUSCH transmission that is scheduled by an UL DCI format and can be triggered by the gNB 102. The retransmission can be triggered by setting a CSI request field value to 0 to indicate no multiplexing of CSI reports in the PUSCH and setting the UL-SCH indicator field value to 0 to indicate no multiplexing of an UL-SCH in the PUSCH. Remaining fields of the UL DCI format, when applicable, can be as when the UL DCI format schedules multiplexing of UL-SCH or CSI reports in a PUSCH transmission. For example, UL DCI format fields that the UE 116 uses to determine frequency, time, or spatial resources or a power for a PUSCH transmission can apply as for the case that the UE 116 multiplexes UL-SCH or CSI reports in the PUSCH transmission. Other fields in the UL DCI format that are not applicable when the PUSCH conveys only UCI can be used to indicate the HARQ-ACK codeword to be retransmitted by the UE 116 if it is not by default the HARQ-ACK codeword in a last PUCCH or PUSCH transmission by the UE. For example, a HARQ process number field can indicate one from a number of previous occasions where the UE 116 was triggered to transmit a HARQ-ACK information codeword (including dropped transmissions due to an inability from the UE 116 to transmit a corresponding PUCCH or PUSCH) or one from the number previous occasions where the UE 116 could have transmitted a HARQ-ACK information codeword such as one from a number of previous slots that can be further restricted to ones supporting PUCCH transmissions (for example, excluding slots with only DL symbols). For example, a HARQ process number field can indicate one of a number of sets of HARQ processes for the UE to provide HARQ-ACK information. Additional fields, such as a redundancy version (RV) field or a new data indicator (NDI) field can also be used to indicate the HARQ-ACK codeword to be transmitted, or the HARQ processes with HARQ-ACK information to be transmitted. In case the UE 116 supports multiple priority types, the HARQ-ACK information can be of a priority type indicated or, in general, determined by the DCI format triggering the PUSCH transmission with the HARQ-ACK codeword.

In operation 1010, the UE 116 detects a DCI format that includes a CSI request field that has a value of zero and a UL-SCH indicator field that has a value of zero. In operation 1020, the UE 116 determines a HARQ-ACK information codeword to retransmit. To determine the codeword to retransmit, if it can be a HARQ-ACK codeword other than a HARQ-ACK codeword in a latest PUCCH or PUSCH transmission (of a same priority type when more that one priority types exist and one is indicated by a field in the DCI format or, in general, determined from the DCI format), the UE 116 reinterprets a value of a field in the DCI format that is not associated with the transmission of the HARQ-ACK information codeword in the PUSCH, such as a value of a HARQ process number field, a redundancy version (RV) field, or a new data indicator (NDI) field. In operation 1030, the UE 116 transmits the determined HARQ-ACK information codeword in the PUSCH.

Although described herein as detecting a DCI format with a CSI request field with a value of zero, various embodiments are possible. For example, various embodiments of the present disclosure enable the gNB 102 to indicate, and for the UE 116 to determine, a retransmission of a HARQ-ACK codeword in a PUSCH without the CSI request value in the UL DCI format being zero and thereby enabling the UE 116 to also multiplex CSI reports in the PUSCH. In particular, the gNB 102 can indicate, and the UE 116 can determine, a retransmission of a HARQ-ACK codeword in a PUSCH when a downlink assignment index (DAI) field in the UL DCI format has a non-zero value and the UL-SCH indicator field indicates no multiplexing of UL-SCH in the PUSCH transmission. The UE 116 can determine the HARQ-ACK information codeword to transmit in the PUSCH using a value of one or more fields in the DCI format that are not applicable to the HARQ-ACK information codeword, such as a HARQ process number field, as previously described herein. A zero value for the HARQ process number field can correspond to an initial transmission of a HARQ-ACK codeword that was indicated to be transmitted during a transmission time interval that overlaps with the one for the PUSCH transmission.

Figure 11:
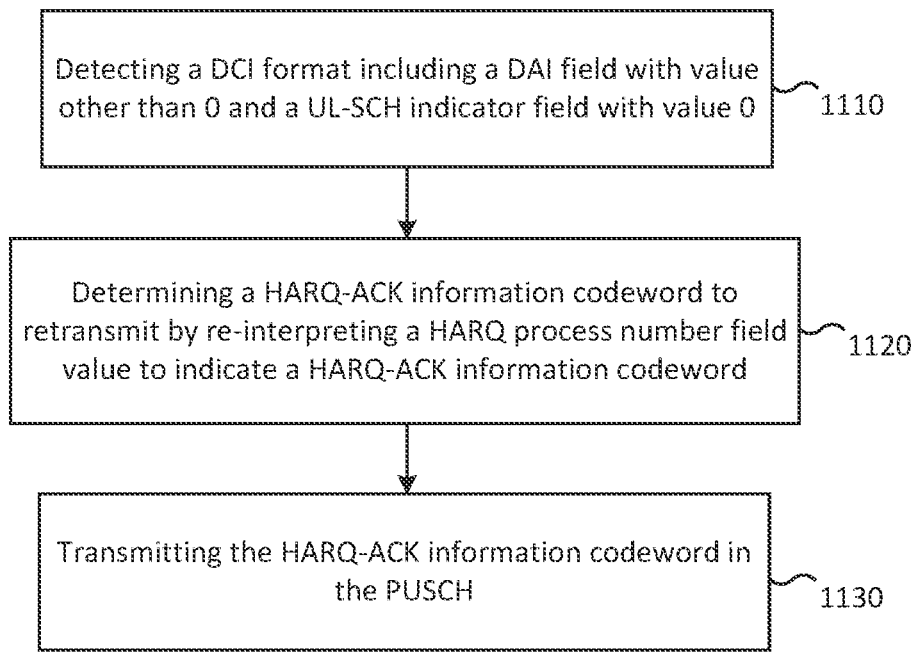
FIG. 11 illustrates a method of multiplexing HARQ-ACK information in a PUSCH transmission according to various embodiments of the present disclosure.

FIG. 11 illustrates a method of multiplexing HARQ-ACK information in a PUSCH transmission according to various embodiments of the present disclosure. More particularly, FIG. 11 illustrates a method of multiplexing HARQ-ACK information in a PUSCH transmission where the DAI field is a value other than zero. Although described herein as being implemented by the UE 116, the method illustrated in FIG. 11 can be implemented by one or more of the UEs 111-116 and a corresponding method can be performed by one or more of the gNBs 101-103 described in FIG. 1. Other embodiments can be used without departing from the scope of the present disclosure.

In operation 1110, the UE 116 detects a DCI format including a DAI field with value other than zero and an UL-SCH indicator field with a value of zero. In operation 1120, the UE 116 determines a HARQ-ACK information codeword to retransmit. The UE 116 determines the HARQ-ACK information codeword to retransmit, if it is not always a HARQ-ACK codeword in a latest PUCCH or PUSCH transmission (of a same priority type when more than one priority types exist and one is indicated by a field in the DCI format or is determined from the DCI format), by re-interpreting a value of field in the DCI format that is not associated with the transmission of the HARQ-ACK information codeword in the PUSCH, such as a value of a HARQ process number field, a RV field, or a NDI field. In operation 1130, the UE 116 transmits the determined HARQ-ACK information codeword in the PUSCH.

Although described herein as the UE 116 multiplexing a HARQ-ACK information codeword in a PUCCH or a PUSCH transmission, which occurred or was dropped at a previous time occasion, these embodiments can also apply to an initial transmission of a HARQ-ACK information codeword. For example, an initial transmission of a HARQ-ACK information codeword can occur in a PUSCH transmission when the UE 116 detects a DCI format scheduling the PUSCH transmission after a last DCI format scheduling a last PDSCH reception or SPS PDSCH release with corresponding HARQ-ACK information included in the HARQ-ACK information codeword and the PUSCH transmission is to occur no later than a PUCCH transmission with the HARQ-ACK information codeword as indicated by the last DCI format.

Various embodiments of the present disclosure enable a UE to determine multiple UCI codewords, such as HARQ-ACK codewords, associated with different service/priority types and a simultaneous transmission for each of the multiple UCI codewords in respective multiple channels, such as PUSCH or PUCCH. For example, the UE 116 can determine the HARQ-ACK information codeword type or the CSI report type based on an (explicit or implicit) indication of a priority type by a corresponding DCI format or by higher layer signaling. For example, a first and second DCI format can be associated with a first and second HARQ-ACK information codeword type, respectively, where the DCI format differentiation can be based on a corresponding C-RNTI, size, or DCI format identification field value for a corresponding priority type.

The UE 116 can indicate a capability for simultaneous transmission for a number of PUCCHs, a number of PUSCHs, or a number of PUCCHs and PUSCHs in a bandwidth part (BWP) of a serving cell, different BWPs of a serving cell, or BWPs of different cells. Based on the capability indication of the UE 116 to simultaneously transmit a first number of channels on a serving cell and, on a subsequent configuration by a serving gNB, for simultaneous transmission for a second number of channels on the serving cell, where the second number is not larger than the first number, the UE 116 can multiplex and transmit UCI codewords in different PUCCHs or PUSCHs.

Figure 12:
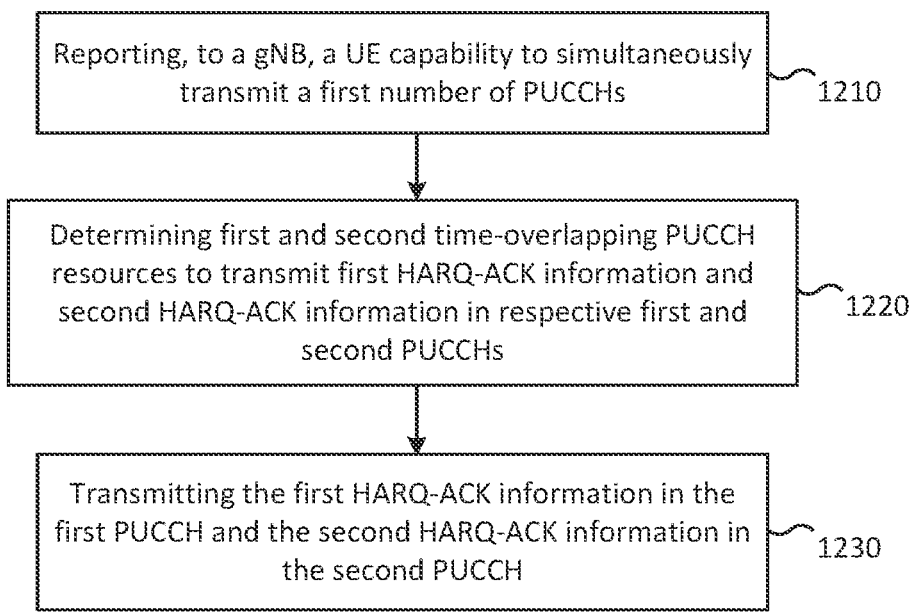
FIG. 12 illustrates a method of simultaneously transmitting two UCI codewords in two PUCCH transmissions on a serving cell according to various embodiments of the present disclosure.

FIG. 12 illustrates a method of simultaneously transmitting two UCI codewords in two PUCCH transmissions on a serving cell according to various embodiments of the present disclosure. Although described herein as being implemented by the UE 116, the method illustrated in FIG. 12 can be implemented by one or more of the UEs 111-116 and a corresponding method can be performed by one or more of the gNBs 101-103 described in FIG. 1. Other embodiments can be used without departing from the scope of the present disclosure.

In operation 1210, the UE 116 transmits, to a gNB 102, the capability of the UE 116 to simultaneously transmit a first number of PUCCHs. In response, the UE 116 can receive, from the gNB 102, a configuration to enable simultaneous transmission for a second number, not greater than the first number, of PUCCHs. If the UE 116 does not receive the configuration information from the gNB 102, the UE 116 prepares to simultaneously transmit a number of PUCCHs equal to the number for the reported UE capability.

In operation 1220, based on the UE 116 detecting multiple DCI formats scheduling PDSCH receptions or SPS PDSCH release, the UE 116 determines first and second PUCCH resources for multiplexing respective first and second HARQ-ACK information codeword types or, in general, first and second UCI types in first and second PUCCH transmissions. In this embodiment, the first and second PUCCH resources overlap in time. In operation 1230, the UE 116 transmits the first HARQ-ACK information in the first PUCCH and the second HARQ-ACK information in the second PUCCH.

Although described herein as transmitting first and second PUCCHs that include first and second HARQ-ACK information codeword types, respectively, on a same serving cell, various embodiments are possible. For example, the UE 116 can transmit the first PUCCH and the second PUCCH on different serving cells. For example, a first cell can be a primary cell (PCell) and a second cell can be a PUCCH secondary cell (PUCCH-SCell or PSCell). Then, based on a reception from the gNB 102, the UE 116 can transmit the first PUCCH that includes the first HARQ-ACK information codeword type (or first UCI type) on a first serving cell and transmit the second PUCCH that includes the second HARQ-ACK information codeword type (or second UCI type) on a second serving cell.

Various embodiments of the present disclosure enable a UE 116 to multiplex UCIs of a same type, such as HARQ-ACK information or CSI reports, associated with different service/priority types in a same PUCCH transmission. For example, the UE 116 can multiplex UCIs of a same type when, for example, latency requirements for the different service/priority types are similar. The UE 116 can receive a signal from a gNB 102 to multiplex the UCIs of the same type. Instructions to multiplex the UCIs of the same type can be stored in the memory 360. As described herein, the UCI type can be HARQ-ACK information, but various embodiments are possible. For example, the UCI type can be CSI reports or SR.

Further, to enable multiplexing of a first UCI with a first priority type and a second UCI of a second priority type in a PUSCH or PUCCH while considering latency constraints when the PUSCH or PUCCH can have a duration that is not sufficiently short to satisfy the latency constraints, a DCI format can indicate enabling of disabling of multiplexing of the first UCI and the second UCI in a PUCCH or a PUSCH transmission. For example, a first DCI format that schedules a first PDSCH reception by UE 116 and triggers a first PUCCH transmission by UE 116 with first HARQ-ACK information of a first priority type in response to decoding outcomes of TBs by UE 116 in the first PDSCH reception, can indicate either through a dedicated field or implicitly through values of other fields whether or not UE 116 should multiplex UCI of a second priority type in the PUCCH transmission.

As another example, the UE 116 can apply joint or separate coding for a transmission of first and second HARQ-ACK information types associated with detection by the UE of respective first and second DCI formats. The UE 116 can receive a signal from a gNB 102, such as a field in a DCI format or higher layer signaling, to apply the joint or separate coding. Instructions to apply the joint or separate coding can be stored in the memory 360. In various embodiments, the UE 116 can apply joint coding when BLERs for the first and second HARQ-ACK information types are similar. When BLERs for the first and second HARQ-ACK information types are not similar, the UE 116 can apply separate coding. In various embodiments, the first and second DCI formats can be associated with respective first and second service/priority types.

Figure 13:
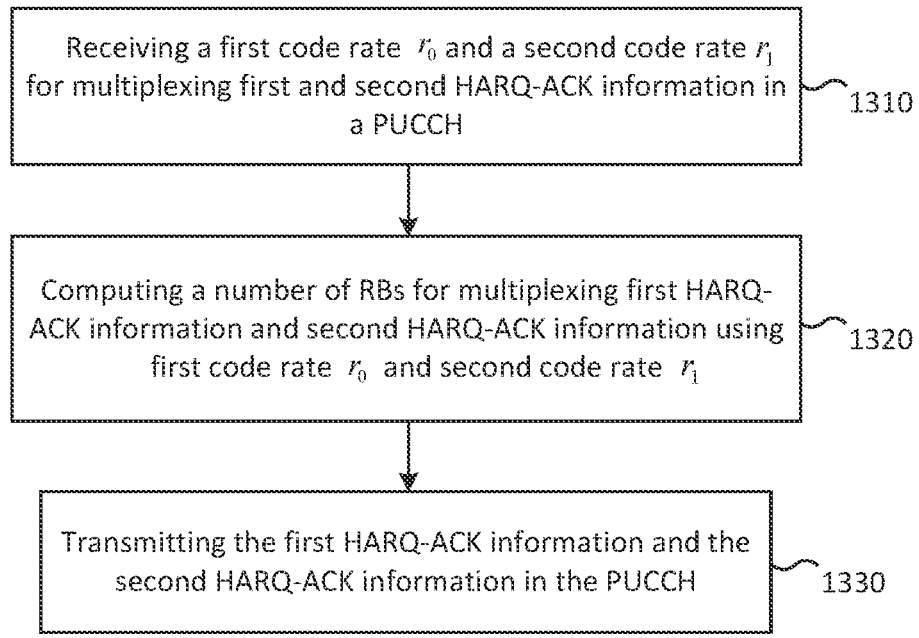
FIG. 13 illustrates a method of multiplexing two UCI codewords in a PUCCH transmission according to various embodiments of the present disclosure.

FIG. 13 illustrates a method of multiplexing two UCI codewords in a PUCCH transmission according to various embodiments of the present disclosure. Although described herein as being implemented by the UE 116, the method illustrated in FIG. 13 can be implemented by one or more of the UEs 111-116 and a corresponding method can be performed by one or more of the gNBs 101-103 described in FIG. 1. Other embodiments can be used without departing from the scope of the present disclosure.

In operation 1310, the UE 116 receives a first code rate $r_0$ and a second code rate $r_1$ for multiplexing first and second HARQ-ACK information types in a PUCCH. The UE 116 can receive the first code rate $r_0$ and the second code rate $r_1$ from the gNB 102, for example by higher layer signaling. The first code rate $r_0$ and the second code rate $r_1$ can be stored in the memory 360. In some embodiments, the first code rate $r_0$ can be a maximum code rate and the second code rate $r_1$ can be a second maximum code rate. In other embodiments, the UE 116 can receive from the gNB 102, and store in the memory 360, (i) one of the first maximum code rate $r_0$ or the second maximum code rate $r_1$ and (ii) a code rate ratio $\gamma = r_0/r_1$ or $\gamma = r_1/r_0$).

In operation 1320, the UE 116 computes a number of RBs for multiplexing the first HARQ-ACK information and the second HARQ-ACK information using the first code rate $r_0$ and the second code rate $r_1$. The UE 116 computes the numbers of RBs by applying either of a first or second realization, determining a PUCCH transmission power, and transmitting the PUCCH with the HARQ-ACK information.

For example, according to a first realization, the UE 116 can determine a number of RBs $M_{RB,min}^{PUCCH}$ for the PUCCH transmission as the minimum number of RBs satisfying Equations 4A and 4B, shown below.

$$\left(O_{ACK,0} + O_{CRC,0} + \frac{r_0}{r_1} \cdot (O_{ACK,1} + O_{CRC,1})\right) \leq \qquad \text{Equation 4A}$$

$$M_{RB,min}^{PUCCH} \cdot N_{sc,ctrl}^{RB} \cdot N_{symb-UCI}^{PUCCH} \cdot Q_m \cdot r_0$$

$$\left(O_{ACK,0} + O_{CRC,0} + \frac{r_0}{r_1} \cdot (O_{ACK,1} + O_{CRC,1})\right) > \qquad \text{Equation 4B}$$

$$\left(M_{RB,min}^{PUCCH} - 1\right) \cdot N_{sc,ctrl}^{RB} \cdot N_{symb-UCI}^{PUCCH} \cdot Q_m \cdot r_0$$

According to the second realization, the UE 116 can determine a number of RBs $M_{RB,min}^{PUCCH}$ for the PUCCH transmission as the minimum number of RBs satisfying Equations 5A and 5B, shown below.

$$\left(\frac{r_1}{r_0} \cdot (O_{ACK,0} + O_{CRC,0}) + (O_{ACK,1} + O_{CRC,1})\right) \leq \qquad \text{Equation 5A}$$

-continued $$\left(\frac{r_1}{r_0} \cdot (O_{ACK,0} + O_{CRC,0}) + (O_{ACK,1} + O_{CRC,1})\right) > \quad \text{Equation 5B}$$

$$\left(M_{RB,min}^{PUCCH} - 1\right) \cdot N_{sc,ctrl}^{RB} \cdot N_{symb-UCI}^{PUCCH} \cdot Q_m \cdot r_1$$

In Equations 4A, 4B, 5A, and 5B, $O_{ACK,0}$ and $O_{ACK,1}$ are the HARQ-ACK information bits for the respective first and second codewords of HARQ-ACK information, $C_{CRC,0}$ and $O_{CRC,1}$ are the CRC bits for the respective first and second codewords, $N_{sc,ctrl}^{RB}$ is a number of REs available for UCI multiplexing in the PUCCH, $N_{symb-UCI}^{PUCCH}$ is a number of PUCCH symbols used for UCI transmission, and $Q_m$ is a modulation order for the UCI in the PUCCH.

The UE 116 can determine whether to apply the first or the second realization in determining the number of RBs for the PUCCH transmission that includes the first and second HARQ-ACK information types depending on whether the PUCCH resource is respectively associated with the first or the second HARQ-ACK information type. The UE 116 can determine a transmission power for the PUCCH transmission that includes the first and second HARQ-ACK information types according to whether the PUCCH resource is respectively associated with the first or the second HARQ-ACK information type where a serving gNB 102 can configure the UE 116 with first and second PUCCH transmission power control parameters for PUCCH resources associated with the first and second HARQ-ACK information types, respectively. The serving gNB 102 can also configure the UE 116 to use either the first or the second PUCCH resources or the UE 116 can determine whether to use either the first or the second PUCCH resources based on a predefined criterion such as for example to always use either the first or the second PUCCH resources, or to use the PUCCH resources that are later in time, or to use the PUCCH resources that end earlier in time. For example, the UE 116 can use a PUCCH resource associated with the HARQ-ACK information type having a lower priority as typically such a resource can accommodate a larger number of UCI bits that a PUCCH resource associated with the HARQ-ACK information type having a larger priority. For example, the UE 116 can use a PUCCH resource that ends earlier in time in order to minimize a latency for providing HARQ-ACK information.

If the number of RBs $M_{RB}^{PUCCH}$ configured for the PUCCH resource, i.e. the maximum number of available RBs for PUCCH transmission with the first and second HARQ-ACK information codewords, is not smaller than $M_{RB,min}^{PUCCH}$ Equation 4B or Equation 5B is satisfied. In some embodiments, if Equation 4B or Equation 5B is not satisfied, the UE 116 can drop the first HARQ-ACK information or the second HARQ-ACK information and transmit the PUCCH with the second HARQ-ACK information or the first HARQ-ACK information, respectively, over the $M_{RB}^{PUCCH}$ RBs. For example, the UE can drop the HARQ-ACK information with lower priority type. In other embodiments, if Equation 4B or Equation 5B is not satisfied, the UE 116 can apply HARQ-ACK bundling (in one or more of the spatial domain, the time domain, or the cell domain), for example for the first HARQ-ACK information having a lower priority until Equation 6 is satisfied or Equation 7 is satisfied.

$$\left(O_{ACK,0}^{bundle} + O_{CRC,0}^{bundle} + \frac{r_0}{r_1} \cdot (O_{ACK,1} + O_{CRC,1})\right) \le \quad \text{Equation 6}$$

-continued $$M_{RB}^{PUCCH} \cdot N_{sc,ctrl}^{RB} \cdot N_{symb-UCI}^{PUCCH} \cdot Q_m \cdot r_0$$

$$\left(\frac{r_1}{r_0} \cdot (O_{ACK,0}^{bundle} + O_{CRC,0}^{bundle}) + (O_{ACK,1} + O_{CRC,1})\right) \le \quad \text{Equation 7}$$

$$M_{RB,min}^{PUCCH} \cdot N_{sc,ctrl}^{RB} \cdot N_{symb-UCI}^{PUCCH} \cdot Q_m \cdot r_1$$

In Equations 6 and 7, $O_{ACK,0}^{bundle}$ and $O_{CRC,0}^{bundle}$ are respectively a number of first HARQ-ACK information bits and corresponding CRC bits after bundling.

In operation 1330, the UE 116 transmits the PUCCH with the resulting first HARQ-ACK information and second HARQ-ACK information over the $M_{RB,min}^{PUCCH}$ RBs computed in operation 1320. The UE 116 can receive the HARQ-ACK information to transmit (or drop/bundle) associated with one or more DCI formats. For example, the UE 116 can transmit the HARQ-ACK information associated with the DCI format scheduling PDSCH receptions for URLLC services, as determined by a priority indicated by the DCI format. Alternatively, the determination can be from the DCI format, for example through a size of the DCI format or through an RNTI scrambling a CRC of the DCI format, and the DCI format can be predetermined in the system operation or configured to the UE by higher layers. The UE 116 can also select a PUCCH resource for transmission of the first HARQ-ACK information and the second HARQ-ACK information depending on whether or not the UE 116 needs to drop transmission of a HARQ-ACK information codeword. Then, the UE 116 can select the PUCCH resource that avoids dropping/bundling HARQ-ACK information.

In some embodiments, the method illustrated in FIG. 13 can be extended for transmission of first and second CSI reports. For example, a UE 116 can transmit a first PUCCH for first $N_{CSI,0}$ CSI reports and a second PUCCH for second $N_{CSI,1}$ CSI reports that overlap in time. Both first CSI reports and second CSI reports can include only CSI part 1 reports and can be associated with different service/priority types. In some embodiments, the first CSI reports and second CSI reports can include CSI part 2 reports or only the first CSI reports can include CSI part 2 reports. The UE 116 can multiplex the first $N_{CSI,0}$ CSI reports and the second $N_{C1,1}$ CSI reports in a PUCCH. When Equation 8 is satisfied, where $r_0$ and $r_1$ can be provided by a same configuration, or by separate configurations for HARQ-ACK information and CSI reports to enable different BLER targets for HARQ-ACK information and CSI, the UE 116 can drop first CSI reports until a number of reported first CSI reports is such that Equation 9 is satisfied.

$$\left(\frac{r_1}{r_0} \cdot \left(\sum_{n=1}^{N_{CSI,0}} O_{CSI,0-part1,n} + O_{CRC,CSI,0-part1,N}\right) + \quad \text{Equation 8}\right.$$

$$\left.\left(\sum_{n=1}^{N_{CSI,1}} O_{CSI-part1,n} + O_{CRC,CSI,1-part1,N}\right)\right) >$$

$$M_{RB,min}^{PUCCH} \cdot N_{sc,ctrl}^{RB} \cdot N_{symb-UCI}^{PUCCH} \cdot Q_m \cdot r_1$$

$$\left(\frac{r_1}{r_0} \cdot \left(\sum_{n=1}^{N_{CSI,0}^{reported}} O_{CSI,0-part1,n} + O_{CRC,CSI,0-part1,N}\right) + \quad \text{Equation 9}\right.$$

-continued $$\left[\left(\sum_{n=1}^{N_{CSI,1}} O_{CSI-part1,n} + O_{CRC,CSI,1-part1,N}\right)\right] \le$$

$$M_{RB,min}^{PUCCH} \cdot N_{sc,ctrl}^{RB} \cdot N_{symb-UCI}^{PUCCH} \cdot Q_m \cdot r_1$$

In Equation 9, $O_{CSI,0-part1,n}$ is the number of information bits for the n-th first CSI report, $O_{CRC,CSI,0-part1,N}^{reported}$ is a number of CRC bits corresponding to $\sum_{n=1}^{N_{CSI,0}^{reported}} O_{CSI,0-part1,n}$ first CSI reports, $O_{CSI,1-part1,n}$ is the number of information bits for the n-th second CSI report, and $O_{CRC,CSI,1-part1,N}$ is a number of CRC bits corresponding to $\sum_{n=1}^{N_{CSI,1}} O_{CSI-part1,n}$ second CSI reports. In some embodiments, such as when first CSI reports also include CSI part 2 reports, the CSI part 2 reports can be dropped with priority prior to dropping CSI part 1 reports.

Various embodiments of the present disclosure provide configurations for a UE to provide multiple CSI reports for respective multiple MCS tables for PDSCH receptions on a same bandwidth part of a serving cell. For example, in order to avoid increasing measurements, the UE 116 can use a same CSI-RS configuration for channel and interference measurements to obtain multiple CSI reports for the corresponding multiple MCS tables. A PUCCH configuration can be separately provided to the UE 116 for each CSI report from the multiple CSI reports. For example, a gNB, such as the gNB 101, gNB 102, or gNB 103, can separately provide, to the UE 116 for each CSI report, a CSI report periodicity and a corresponding PUCCH resource for the UE 116 to transmit the CSI report.

For ease of explanation, the various embodiments described below use two CSI reports. However, the examples provided below are for illustration only and should not be construed as limiting. Various embodiments are possible. For example, more or fewer than two CSI reports can be used without departing from the scope of the present disclosure.

Figure 14:
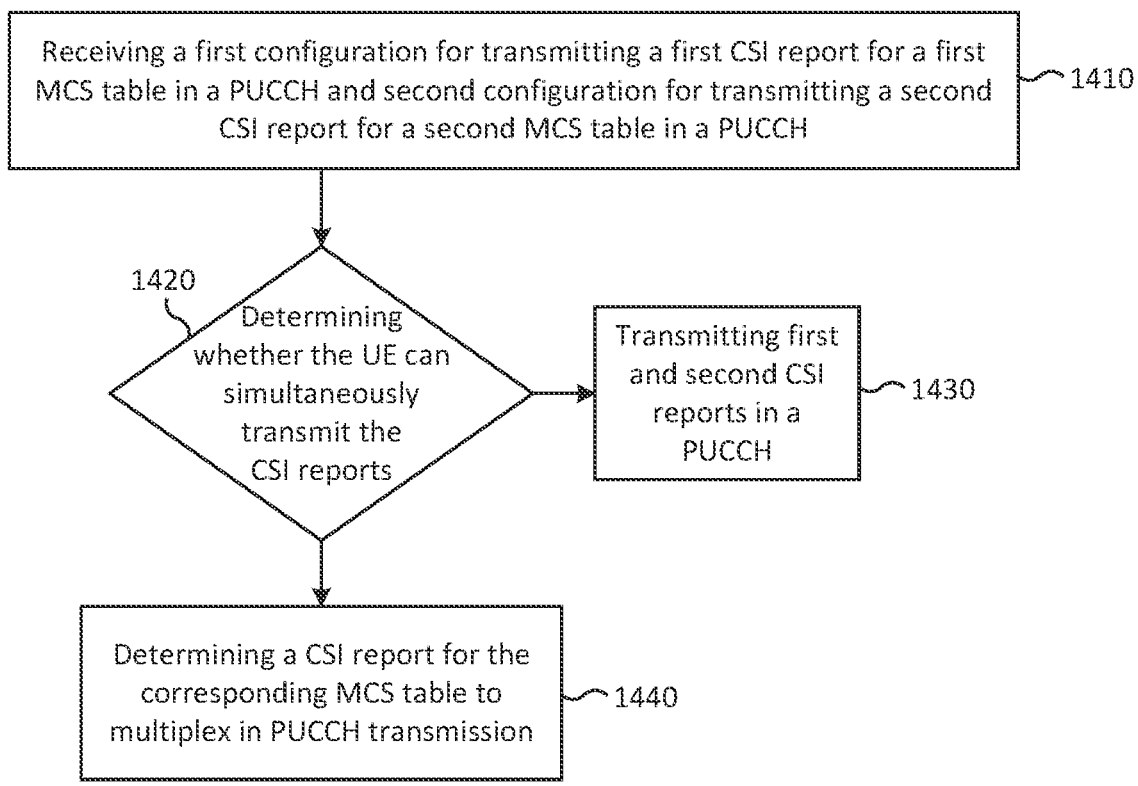
FIG. 14 illustrates a method of multiplexing two CSI reports corresponding to two different MCS tables according to various embodiments of the present disclosure.

FIG. 14 illustrates a method of multiplexing two CSI reports corresponding to two different MCS tables according to various embodiments of the present disclosure. Although described herein as being implemented by the UE 116, the method illustrated in FIG. 14 can be implemented by one or more of the UEs 111-116 and a corresponding method can be performed by one or more of the gNBs 101-103 described in FIG. 1. Other embodiments can be used without departing from the scope of the present disclosure.

In operation 1410, the UE 116 receives a first configuration for transmitting a first CSI report corresponding to a first MCS table in a PUCCH and a second configuration for transmitting a second CSI report corresponding to a second MCS table in a PUCCH. The UE 116 can receive the first configuration and the second configuration from the gNB 102. The first configuration and the second configuration can be stored in the memory 360.

When the UE 116 is configured to provide a first CSI report corresponding to a first MCS table with a first periodicity and a second CSI report corresponding to a second MCS table with a second periodicity, the UE 116 can be configured to transmit the CSI reports when it is beneficial for the UE 116 to simultaneously transmit the two CSI reports and the UE 116 does not multiplex the two CSI reports in a same PUCCH. This is separate from determining whether the UE 116 is able to multiplex CSI reports for a same MCS table in a PUCCH, such as CSI reports corresponding to different cells.

In operation 1420, the UE 116 determines whether the CSI reports can be simultaneously transmitted. For example, if it is not beneficial for the UE 116 to simultaneously transmit a PUCCH with the first CSI report and a PUCCH with the second CSI report, the UE 116 determines whether the UE 116 can multiplex the two CSI reports in a same PUCCH. In some embodiments, the determination can be based on corresponding configuration by the serving gNB 102 or can be derived by other parameters such as a corresponding PUCCH transmission power, a corresponding PUCCH transmission duration, or the CSI report payload where, for example, a larger power or a smaller duration or payload can be prioritized.

If the processor 340 determines the UE 116 can simultaneously transmit the CSI reports, the UE 116 proceeds to operation 1430. If the processor 340 determines the UE 116 cannot simultaneously transmit the CSI reports, the UE 116 proceeds to operation 1440.

In operation 1430, in response to determining the CSI reports can be simultaneously transmitted, the UE 116 multiplexes and transmits the first and second CSI reports in a single PUCCH.

In operation 1440, the UE 116 determines a CSI report for the corresponding MCS table to multiplex in a PUCCH transmission. In an embodiment where the UE 116 provides a first CSI report and a second CSI report, the UE 116 can provide only a CQI value for the second CSI report as other CSI components, such as a PMI or a CSI-RS resource indicator (CRI), can be obtained from the first CSI report, for example when a PDSCH transmission rank can be restricted to one. In another embodiment, the UE 116 can provide a CQI value and a rank indicator (RI) value in the second CSI report. In another embodiment, the UE 116 always provides only a CQI value in the second CSI report. In another embodiment, the UE 116 always provides only a CQI value and a RI value, when applicable, in the second CSI report.

In embodiments where the UE 116 multiplexes a first CSI report and a second CSI report in a same PUCCH or PUSCH, the UE 116 can provide only a CQI value, or only a CQI value and a RI value, for each of the first and the second CSI report even if the UE is configured to provide additional information, such as a PMI, for each of the CSI reports. In other words, the UE 116 drops information such as a PMI or CRI from either the first or the second CSI report and multiplexes PMI or CRI in only one of the first or second CSI reports in a corresponding PUCCH or PUSCH. The UE 116 can also indicate a CQI value for either the first or the second CSI report as an offset to the CQI value for the second or the first CSI report, respectively. A CQI value is an index to a corresponding MCS table.

Various embodiments of the present disclosure enable a determination of a number of resource elements (REs) for multiplexing UCI in a repetition of a PUSCH transmission having a number of repetitions.

A PUSCH transmission can include a number of repetitions where the number can be received in advance by the UE 116, or indicated by an UL DCI format that schedules the PUSCH transmission, or determined by the UE 116 as previously described. In embodiments where a same target BLER for the TB(s) provided by the PUSCH transmission is independent of the number of repetitions, a spectral efficiency for each corresponding repetition can vary depending on the number of repetitions. For example, for a same BLER of a received TB after a number of repetitions for an associated PUSCH, a spectral efficiency of a repetition is smaller when the number of repetitions is eight than when the number of repetitions is four.

Various embodiments of the present disclosure recognize the scheduling constraints and communication latency of multiplexing the UCI starting from the first repetition and over all repetitions of a PUSCH transmission. In particular, it is difficult for the UCI to be transmitted at any time instance and the UCI reception would be completed only after a reception for all repetitions of the PUSCH transmission is completed (although partial reception can be in every repetition). Accordingly, various embodiments of the present disclosure overcome the shortcomings of the UE 116 multiplexing the UCI from a first repetition and over all repetitions of a PUSCH transmission, or dropping either the data or the UCI transmission, by enabling the UCI to be multiplexed starting from any repetition of the PUSCH transmission.

In some embodiments, for example for multiplexing CSI reports, the number of PUSCH repetitions for multiplexing the UCI can be configured by higher layer signaling. For example, the number of PUSCH repetitions for multiplexing the UCI can be the same as for UCI multiplexing in a PUCCH transmission or can be separately configured. In some embodiments, for HARQ-ACK information associated with PDSCH receptions scheduled by a DL DCI format or with a SPS PDSCH release, the number of PUSCH repetitions for multiplexing UCI can be either indicated by/determined from the DL DCI format or can be configured by higher layers. When the UCI is to be transmitted with a number of repetitions in a PUCCH transmission that is larger than a number of repetitions of a PUSCH transmission where the UCI is multiplexed, the UE 116 can multiplex the UCI in repetitions of the PUSCH transmission, instead of repetitions of a PUCCH transmission that overlap in time with the repetitions of the PUSCH transmission, and multiplex the UCI in remaining repetitions of the PUCCH transmission that do not overlap in time with the repetitions of the PUSCH transmission.

Figure 15:
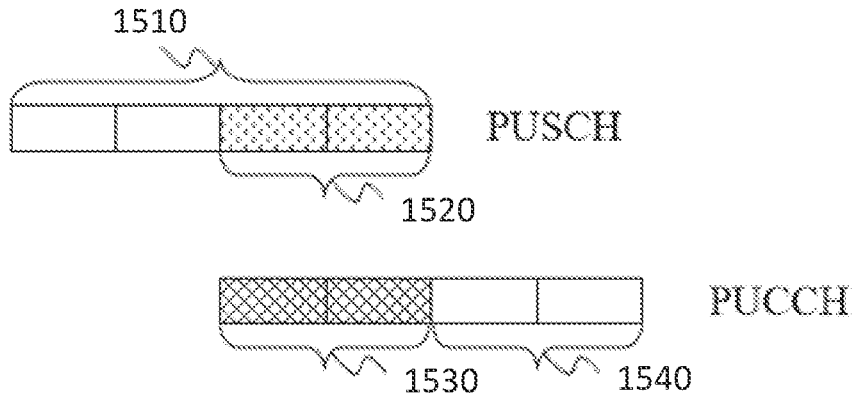
FIG. 15 illustrates example PUSCH transmissions and PUCCH transmissions according to various embodiments of the present disclosure.

For example, FIG. 15 illustrates example PUSCH transmissions and PUCCH transmissions according to various embodiments of the present disclosure. Although described herein as being implemented by the UE 116, the method illustrated in FIG. 15 can be implemented by one or more of the UEs 111-116 and a corresponding method can be performed by one or more of the gNBs 101-103 described in FIG. 1. The example PUSCH transmissions and PUCCH transmissions illustrated in FIG. 15 are for illustration only and should not be construed as limiting.

A UE 116 transmits a PUSCH with four repetitions 1510 and a PUCCH with four repetitions. As shown in 1520 and 1530, two of the four repetitions of the PUCCH transmission overlap with two repetitions of the PUSCH transmission. The UE 116 multiplexes the UCI in the two overlapping repetitions of the PUSCH transmission with the PUCCH 1530, does not transmit the PUCCH for the overlapped repetitions 1520, and transmits the remaining two repetitions of the PUCCH transmission 1540.

Figure 16:
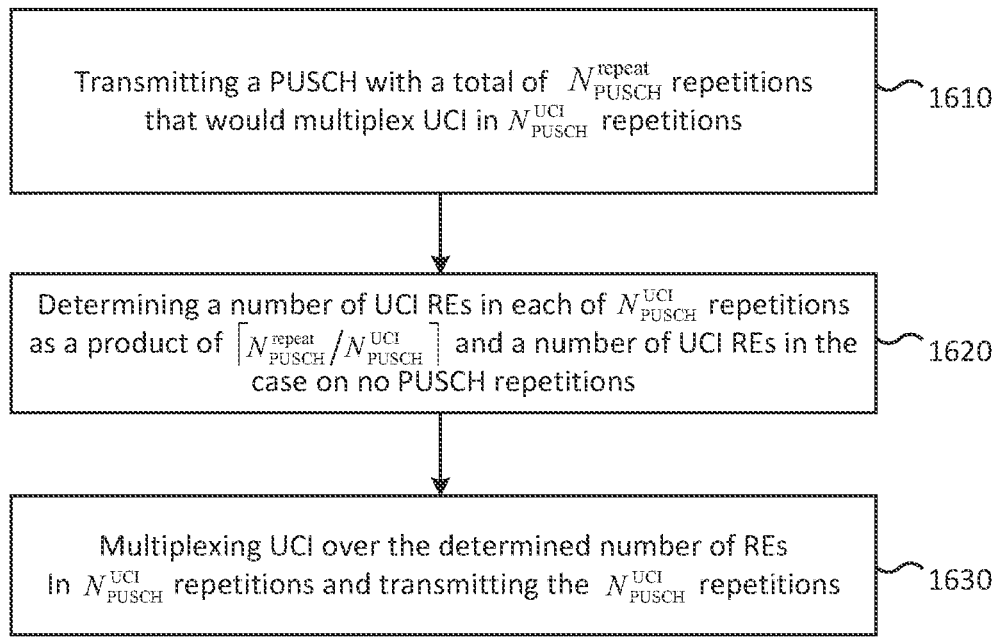
FIG. 16 illustrates a method of determining a number of REs for UCI multiplexing according to various embodiments of the present disclosure.

FIG. 16 illustrates a method of determining a number of REs for UCI multiplexing according to various embodiments of the present disclosure. Although described herein as being implemented by the UE 116, the method illustrated in FIG. 16 can be implemented by one or more of the UEs 111-116 and a corresponding method can be performed by one or more of the gNBs 101-103 described in FIG. 1. Other embodiments can be used without departing from the scope of the present disclosure.

In embodiments where the UE 116 multiplexes the UCI in one or more repetitions of a PUSCH transmission, a location of PUSCH REs used for UCI multiplexing can be the same as when the PUSCH transmission is without repetitions. A number of REs used for UCI multiplexing can depend on the number of repetitions for the PUSCH transmission, as the number of REs determines a spectral efficiency of each repetition. For example, values of the parameter $\beta_{offset}^{HARQ-ACK}$, of the parameter $\beta_{offset}^{CSI-1}$ or of the parameter $\beta_{offset}^{CSI-2}$ can be provided to the UE 116 by higher layers relative to no repetitions of an associated PUSCH transmission.

In operation 1610, the UE 116 transmits a PUSCH that includes a total of $N_{PUSCH}^{repeat}$ repetitions that would multiplex UCI in $N_{PUSCH}^{UCI}$ repetitions. Then, in operation 1620, the UE 116 determines a number of REs (or a number of coded modulation symbols) for multiplexing the UCI in each $N_{PUSCH}^{UCI}$ repetition of the PUSCH transmission as a product of $\lceil N_{PUSCH}^{repeat}/N_{PUSCH}^{UCI} \rceil$ and a number of UCI REs in the case of no PUSCH repetitions. More particularly, the UE 116 determines a number of REs for multiplexing the UCI in each $N_{PUSCH}^{UCI}$ repetition by scaling by $\lceil N_{PUSCH}^{repeat}/N_{PUSCH}^{UCI} \rceil$ a number of REs (or a number of coded modulation symbols) corresponding to $N_{PUSCH}^{repeat}=1$ repetitions (i.e. no repetitions) of the PUSCH transmission. For example, for $N_{PUSCH}^{UCI}=1$, the UE 116 can scale a number of REs for UCI multiplexing, or equivalently a number of UCI coded modulation symbols, by $N_{PUSCH}^{repeat}$. In operation 1630, the UE 116 multiplexes the UCI over the determined number of REs in each of the $N_{PUSCH}^{UCI}$ repetitions and transmits the $N_{PUSCH}^{UCI}$ repetitions. For example, using Equation 2, a number of coded modulation symbols per layer for HARQ-ACK transmission, can be determined, as $$Q'_{ACK} = \min\left\{ \left\lceil \frac{(O_{ACK} + L_{ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \cdot \frac{N_{PUSCH}^{repeat}}{N_{PUSCH}^{UCI}} \right\rceil, \right.$$

$$\left. \left\lceil \alpha \cdot \sum_{l=l_0}^{N_{symb,all}^{PUSCH}-1} M_{sc}^{UCI}(l) \right\rceil \right\}.$$

The scaling is with respect to a number of required coded modulation symbols while a final number of coded modulation symbols can still be subject to an upper bound of $$\left\lceil \alpha \cdot \sum_{l=l_0}^{N_{symb,all}^{PUSCH}-1} M_{sc}^{UCI}(l) \right\rceil.$$

A same modification also applies for determining a number of coded modulation symbols per layer for HARQ-ACK transmission.

Various embodiments of the present disclosure provide a CSI report triggered by a DL DCI format. Various embodiments can include a single CSI report or multiple CSI reports. A single CSI report can correspond to a single cell and one set of time, frequency, and/or spatial resources. Multiple CSI reports can correspond to multiple cells or multiple sets of time, frequency, and/or spatial resources.

For example, for a dynamic HARQ-ACK codebook determined based on a counter DAI field and, when present, on a total DAI field in DL DCI formats, the UE 116 can be triggered to provide a CSI report by a DL DCI format transmitted by the gNB 102. The UE 116 can then multiplex the CSI report and the HARQ-ACK information associated with the DL DCI format in a same PUCCH transmission. An ambiguity between the gNB 102 and the UE 116 can occur for a number of UCI bits when the UE 116 fails to detect the DCI format triggering the CSI report as, in response to identifying based on the counter or total DAI field that the UE 116 failed to detect the DCI format, the UE 116 is unable to determine whether to multiplex in the PUCCH only HARQ-ACK information bits corresponding to TBs in a PDSCH scheduled by the DCI format in case the DCI format does not trigger a CSI report or both the HARQ-ACK information bits and CSI report bits (and possibly SR bits, when any) in case the DCI format triggers a CSI report. An ambiguity in the number of UCI bits can also lead to an ambiguity in a number of RBs for the PUCCH transmission.

Figure 17:
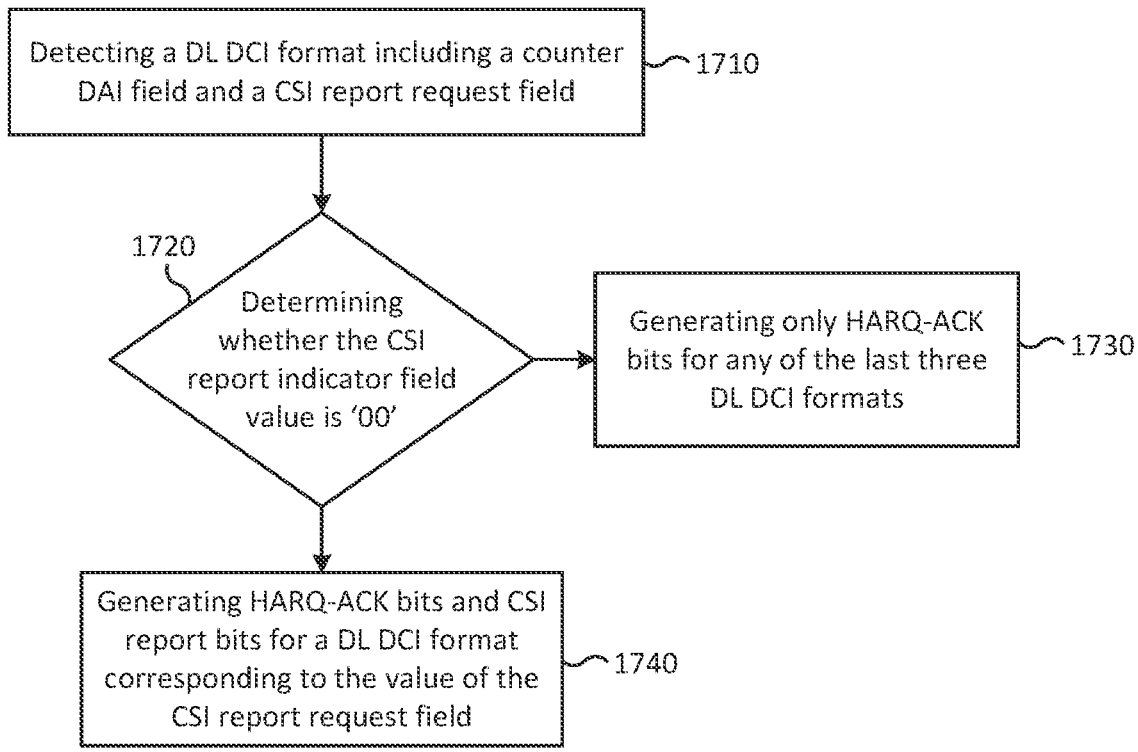
FIG. 17 illustrates a method of multiplexing a CSI report according to various embodiments of the present disclosure.

Accordingly, various embodiments of the present disclosure circumvent this ambiguity between the gNB 102 and the UE 116. For example, FIG. 17 illustrates a method of multiplexing a CSI report according to various embodiments of the present disclosure. Although described herein as being implemented by the UE 116, the method illustrated in FIG. 17 can be implemented by one or more of the UEs 111-116 and a corresponding method can be performed by one or more of the gNBs 101-103 described in FIG. 1. Other embodiments can be used without departing from the scope of the present disclosure.

In operation 1710, the UE 116 detects a DL DCI format that includes a counter DAI field and a CSI report request field. An ordering of DL DCI formats can be across cell indexes for a same PDCCH monitoring occasion and then across PDCCH monitoring occasions. When the UE 116 detects more than one DL DCI formats that schedule respective PDSCH receptions at a same PDCCH monitoring occasion, the value of a counter DAI field can be used to order or index the DL DCI formats.

In a first example, when a DL DCI format triggers a CSI report then, for example, for a CSI request field of 2 bits in a DL DCI format and for 3 consecutive DL DCI formats prior to the DCI format, a value '00' can indicate no CSI report triggered in any of the previous 3 DL DCI formats, a value '1' can indicate that there was a CSI report triggered in the third of previous 3 DL DCI formats, a value '10' can indicate that there was a CSI report triggered in the second of previous 3 DL DCI formats, and a value '01' can indicate that there was a CSI report triggered in the immediately previous DCI format from the 3 DL DCI formats. In operation 1720, the UE 116 determines whether the CSI report request field value is '00'. As described above, various values of the CSI report request field are possible, such as '00', '11', '10', and '01'. When the CSI report request field value is '00', the UE 116 proceeds to operation 1730. Where the CSI report request field value is not '00', the processor 340 proceeds to operation 1740. After determining the CSI report request field value is '00' in operation 1720, in operation 1730 the UE 116 generates only HARQ-ACK bits for the last three DL DCI formats the UE 116 identifies as having failed to detect based on the counter DAI field. After determining the CSI report request field value is not '00' in operation 1720, in operation 1740 the processor 340 generates HARQ-ACK bits and CSI report bits corresponding to a DL DCI format from the last 3 DL DCI formats that the UE 116 identifies as having failed to detect and corresponds to the value provided by the CSI report request field. The HARQ-ACK bits can include NACK values. The last DL DCI formats can be based on the value of the counter DAI field.

In a second example, a CSI report request field can request a CSI report in multiple DCI formats that the UE 116 multiplexes associated HARQ-ACK information in a same PUCCH transmission. The UE 116 multiplexes only one CSI report, after the HARQ-ACK information bits, in the PUCCH transmission (or in a PUSCH transmission) regardless of the number of DCI formats that the UE 116 detects and request a CSI report from the UE 116. In other words, for a PUCCH transmission from UE 116 with HARQ-ACK information in response to PDSCH receptions scheduled by multiple DCI formats, more than one of the multiple DCI formats can request a CSI report from UE 116 and UE 116 provides only a single CSI report that corresponds, for example, to measurements available at a time of a PDCCH reception that provides the first or the last of the more than one DCI formats. The CSI report request field can comprise of one bit.

In some embodiments, the number of CSI report bits can be predetermined and provided in advance by higher layers. If the number of bits for the CSI report is smaller than the predetermined number, the UE 116 can add remaining bits with a predetermined value, such as the one corresponding to a 'NACK' for HARQ-ACK information.

In various embodiments, a DAI field can be combined with a CSI report request field into a single field that can be used by the UE 116 to determine a number of DL DCI formats that the UE 116 failed to detect and DL DCI formats, from the number of DL DCI formats, that included triggering of a CSI report.

Figure 18:
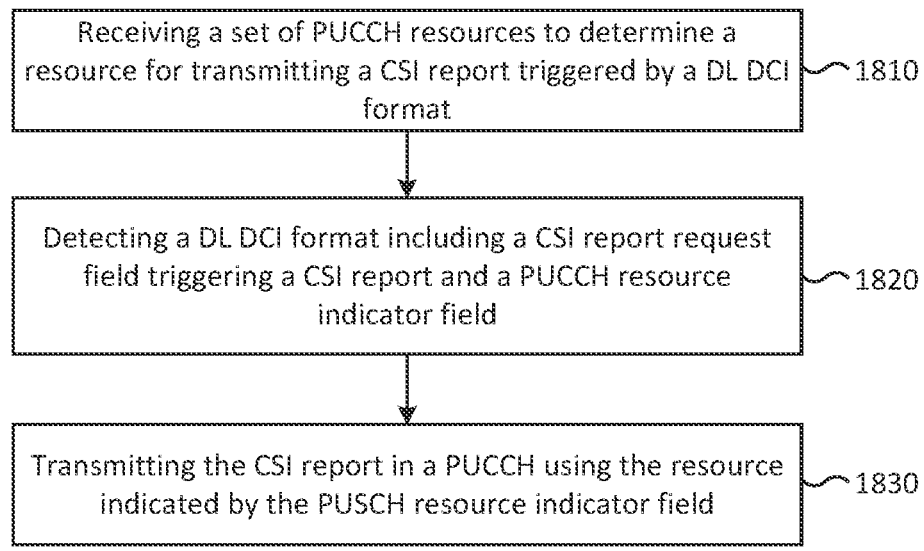
FIG. 18 illustrates a method of multiplexing a CSI report according to various embodiments of the present disclosure.

For example, FIG. 18 illustrates a method of multiplexing a CSI report according to various embodiments of the present disclosure. Although described herein as being implemented by the UE 116, the method illustrated in FIG. 18 can be implemented by one or more of the UEs 111-116 and a corresponding method can be performed by one or more of the gNBs 101-103 described in FIG. 1. Other embodiments can be used without departing from the scope of the present disclosure.

In operation 1810, the UE 116 receives a set of PUCCH resources to determine a resource for transmitting a CSI report triggered by a DL DCI format. The set of PUCCH resources can be stored in the memory 360. For example, the UE 116 can multiplex the CSI report in a PUCCH transmission that does not overlap in time with a PUCCH transmission for HARQ-ACK information. If the PUCCH transmission overlaps in time with the PUCCH transmission for HARQ-ACK information, the UE 116 either multiplexes the HARQ-ACK information and the CSI report in a same PUCCH or the UE 116 does not transmit, for example, the CSI report if multiplexing of HARQ-ACK information and CSI reports is not enabled by configuration.

In operation 1820, the UE 116 detects the DL DCI format that includes a CSI report request field triggering the CSI report and the PUCCH resource indicator field. In various embodiments, when the set includes more than one resource, the PUCCH resource indicator field in the DL DCI format triggering the CSI report can indicate a resource from the set of resources for the PUCCH transmission. The resource for the PUCCH transmission can include time, frequency, and/or spatial resources. For example, the UE 116 can receive, from the gNB 102, a set of four resources for a PUCCH transmission that include a CSI report triggered by a DL DCI format. A field in the DL DCI format triggering the CSI report can indicate one resource from the set of four resources.

In operation 1830, the UE 116 multiplexes the CSI report in the PUCCH transmission using the resource indicated by the PUCCH resource indicator field. In various embodiments, the UE 116 that is triggered a CSI report by a DL DCI format can multiplex the CSI report and the HARQ-ACK information associated with the DL DCI format in separate PUCCH transmissions. It is also possible that a UE is provided a first set of PUCCH resources for use when the UE does not multiplex a triggered CSI report in a PUCCH transmission and a second set of PUCCH resources for use when the UE multiplexes a triggered CSI report in a PUCCH transmission. The UE interprets PUCCH resource indication field in a DCI format scheduling a PDSCH reception by the UE, for the UE to transmit a PUCCH with corresponding HARQ-ACK information, to indicate a resource from the first set of PUCCH resources or from the second set of PUCCH resources according to whether or not the UE is also indicated by the DCI format to multiplex a triggered CSI report in the PUCCH transmission.

Although the present disclosure has been described with an example embodiment, various changes and modifications can be suggested by or to one skilled in the art. It is intended that the present disclosure encompass such changes and modifications as fall within the scope of the appended claims.

What is claimed:

1. A method for providing hybrid automatic repeat request acknowledgement (HARQ-ACK) information, the method comprising:
   receiving:
      a first code rate for encoding first HARQ-ACK information bits of a first priority value, and
      a second code rate for encoding second HARQ-ACK information bits of a second priority value;
   determining a number of resource blocks (RBs) for a physical uplink control channel (PUCCH) resource based on the first code rate and on the second code rate; and
   transmitting a PUCCH on the PUCCH resource using the number of RBs, wherein the PUCCH includes the first HARQ-ACK information bits and the second HARQ-ACK information bits when a maximum number of RBs for the PUCCH resource is greater than a number of RBs required for encoding the second HARQ-ACK information bits with the second code rate.

2. The method of claim 1, wherein:
   the PUCCH includes only the second HARQ-ACK information bits when the maximum number of RBs for the PUCCH resource is less than the number of RBs required for encoding the second HARQ-ACK information bits with the second code rate, and
   the second priority value is larger than the first priority value.

3. The method of claim 1, further comprising:
   canceling transmission of another PUCCH that would overlap in time with transmission of the PUCCH, wherein:
   the other PUCCH includes channel state information (CSI), and
   the CSI is not included in the PUCCH.

4. The method of claim 1, further comprising:
   receiving:
      first information for first PUCCH resources, and
      second information for second PUCCH resources; and
   determining:
      a first PUCCH resource from the first PUCCH resources for a first PUCCH that includes the first HARQ-ACK information bits,
      a second PUCCH resource from the second PUCCH resources for a second PUCCH that includes the second HARQ-ACK information bits, and
      that a transmission of the first PUCCH would overlap in time with a transmission of the second PUCCH, wherein:
      the number of RBs is associated with a resource from the second PUCCH resources, and
      the second priority value is greater than the first priority value.

5. The method of claim 4, further comprising:
   receiving a third code rate for encoding the first HARQ-ACK information bits; and
   determining a number of RBs for the first PUCCH resource based on the third code rate.

6. The method of claim 4, further comprising:
   receiving:
      a first set of parameters for determining a first power for the first PUCCH, and
      a second set of parameters for determining a second power for the second PUCCH;
   determining a power for the PUCCH based on the second set of parameters; and
   wherein transmitting the PUCCH comprises transmitting the PUCCH using the power.

7. The method of claim 6, further comprising:
   determining the power by skipping application of a transmit power control (TPC) command value that is applicable to a repetition of transmissions of the PUCCH, wherein transmission of the PUCCH is with a number of two or more repetitions.

8. A user equipment (UE) comprising:
   a transceiver configured to receive:
      a first code rate for encoding first hybrid automatic repeat request acknowledgement (HARQ-ACK) information bits of a first priority value, and
      a second code rate for encoding second HARQ-ACK information bits of a second priority value; and
   a processor operably coupled to the transceiver, the processor configured to determine a number of resource blocks (RBs) for a physical uplink control channel (PUCCH) resource based on the first code rate and on the second code rate; and
   the transceiver is further configured to transmit a PUCCH on the PUCCH resource using the number of RBs, wherein the PUCCH includes the first HARQ-ACK information bits and the second HARQ-ACK information bits when a maximum number of RBs for the PUCCH resource is greater than a number of RBs required for encoding the second HARQ-ACK information bits with the second code rate.

9. The UE of claim 8, wherein:
   the PUCCH includes only the second HARQ-ACK information bits when the maximum number of RBs for the PUCCH resource is less than the number of RBs required for encoding the second HARQ-ACK information bits with the second code rate, and
   the second priority value is larger than the first priority value.

10. The UE of claim 8, wherein:
    the transceiver is further configured to cancel transmission of another PUCCH that would overlap in time with the PUCCH,
    the other PUCCH includes channel state information (CSI), and
    the CSI is not included in the PUCCH.

11. The UE of claim 8, wherein:
    the transceiver is further configured to receive:
       first information for first PUCCH resources, and
       second information for second PUCCH resources; and the processor is further configured to determine:
a first PUCCH resource from the first PUCCH resources for a first PUCCH that includes the first HARQ-ACK information bits,
a second PUCCH resource from the second PUCCH resources for a second PUCCH that includes the second HARQ-ACK information bits, and
that a transmission of the first PUCCH would overlap in time with a transmission of the second PUCCH, wherein:
the number of RBs is associated with a resource from the second PUCCH resources, and
the second priority value is greater than the first priority value.

12. The UE of claim 11, wherein:
the transceiver is further configured to receive a third code rate for encoding the first HARQ-ACK information bits, and
the processor is further configured to determine a number of RBs for the first PUCCH resource based on the third code rate.

13. The UE of claim 11, wherein:
the transceiver is further configured to receive:
a first set of parameters for determining a first power for the first PUCCH, and
a second set of parameters for determining a second power for the second PUCCH;
the processor is further configured to determine a power for the PUCCH based on the second set of parameters; and
the transceiver is further configured to transmit the PUCCH using the power.

14. The UE of claim 13, wherein:
the processor is further configured to determine the power by skipping application of a transmit power control (TPC) command value that is applicable to a repetition of transmissions of the PUCCH, wherein transmission of the PUCCH is with a number of two or more repetitions.

15. A base station comprising:
a transceiver configured to transmit:
a first code rate for encoding first hybrid automatic repeat request acknowledgement (HARQ-ACK) information bits of a first priority value, and
a second code rate for encoding second HARQ-ACK information bits of a second priority value; and
a processor operably coupled to the transceiver, the processor configured to determine a number of resource blocks (RBs) for a physical uplink control channel (PUCCH) resource based on the first code rate and on the second code rate; and
the transceiver is further configured to receive a PUCCH on the PUCCH resource using the number of RBs,
wherein the PUCCH includes the first HARQ-ACK information bits and the second HARQ-ACK information bits when a maximum number of RBs for the PUCCH resource is greater than a number of RBs required for encoding the second HARQ-ACK information bits with the second code rate.

16. The base station of claim 15, wherein:
the PUCCH includes only the second HARQ-ACK information bits when the maximum number of RBs for the PUCCH resource is less than the number of RBs required for encoding the second HARQ-ACK information bits with the second code rate, and
the second priority value is larger than the first priority value.

17. The base station of claim 15, wherein:
the transceiver is further configured to cancel reception of another PUCCH that would overlap in time with reception of the PUCCH,
the other PUCCH includes channel state information (CSI), and
the CSI is not included in the PUCCH.

18. The base station of claim 15, wherein:
the transceiver is further configured to transmit:
first information for first PUCCH resources, and
second information for second PUCCH resources; and
the processor is further configured to determine:
a first PUCCH resource from the first PUCCH resources for a first PUCCH that includes the first HARQ-ACK information bits,
a second PUCCH resource from the second PUCCH resources for a second PUCCH that includes the second HARQ-ACK information bits, and
that a reception of the first PUCCH would overlap in time with a reception of the second PUCCH, wherein:
the number of RBs is associated with a resource from the second PUCCH resources, and
the second priority value is greater than the first priority value.

19. The base station of claim 18, wherein:
the transceiver is further configured to transmit a third code rate for encoding the first HARQ-ACK information bits, and
the processor is further configured to determine a number of RBs for the first PUCCH resource based on the third code rate.

20. The base station of claim 18, wherein:
the transceiver is further configured to transmit:
a first set of parameters for determining a first power for the first PUCCH, and
a second set of parameters for determining a second power for the second PUCCH.

* * * * *